United States Patent
Fujita

(10) Patent No.: US 12,458,237 B2
(45) Date of Patent: Nov. 4, 2025

(54) HEALTH MONITORING DEVICE, COMPUTER PROGRAM, RECORDING MEDIUM, AND BIOSIGNAL MEASURING DEVICE

(71) Applicant: DELTA KOGYO CO., LTD., Aki-gun (JP)

(72) Inventor: Etsunori Fujita, Higashihiroshima (JP)

(73) Assignee: DELTA KOGYO CO., LTD., Aki-gun (JP)

( * ) Notice: Subject to any disclaimer, the term of this patent is extended or adjusted under 35 U.S.C. 154(b) by 891 days.

(21) Appl. No.: 17/622,549

(22) PCT Filed: Jun. 25, 2020

(86) PCT No.: PCT/JP2020/025110
§ 371 (c)(1),
(2) Date: Dec. 23, 2021

(87) PCT Pub. No.: WO2020/262563
PCT Pub. Date: Dec. 30, 2020

(65) Prior Publication Data
US 2022/0354374 A1    Nov. 10, 2022

(30) Foreign Application Priority Data
Jun. 25, 2019  (JP) ................. 2019-117935

(51) Int. Cl.
*A61B 5/021*  (2006.01)
*A61B 5/00*  (2006.01)
*A61B 7/00*  (2006.01)

(52) U.S. Cl.
CPC ........ *A61B 5/02108* (2013.01); *A61B 5/6823* (2013.01); *A61B 5/7282* (2013.01); *A61B 7/00* (2013.01)

(58) Field of Classification Search
CPC . A61B 5/02108; A61B 5/6823; A61B 5/7282; A61B 5/0225; A61B 2562/0204; A61B 7/00; A61B 7/045
See application file for complete search history.

(56) References Cited

U.S. PATENT DOCUMENTS

| | | | |
|---|---|---|---|
| 2010/0087746 A1* | 4/2010 | Radzievsky | A61B 7/003 708/271 |
| 2013/0030256 A1 | 1/2013 | Fujita et al. | |

(Continued)

FOREIGN PATENT DOCUMENTS

| | | |
|---|---|---|
| JP | 2011-167362 A | 9/2011 |
| JP | 2014-178 A | 1/2014 |

(Continued)

OTHER PUBLICATIONS

International Search Report mailed on Sep. 15, 2020 in PCT/JP2020/025110 filed on Jun. 25, 2020, 4 pages).

*Primary Examiner* — Devin B Henson
(74) *Attorney, Agent, or Firm* — Oblon, McClelland, Maier & Neustadt, L.L.P.

(57) ABSTRACT

Provided is a health monitoring device that extracts, in particular, an apical beat component from a trunk acoustic pulse wave and thus is also usable in the medical field. The health monitoring device (1000) of the present invention analyzes a trunk acoustic pulse wave to estimate the health condition of a person using a correlation of an indicator relating to a left ventricular pressure waveform which indicates the behavior of the heart, with a vibration frequency of a frequency component stemming from an apical beat, a diastolic time interval in a cardiac cycle, or blood pressure. The former is input information and the latter is output information of the heart through which blood circulates, and thus comparing these two pieces of information makes it (Continued)

possible to know a health condition relating to the function of the heart more accurately than conventionally.

11 Claims, 30 Drawing Sheets

(56) References Cited

U.S. PATENT DOCUMENTS

| | | | |
|---|---|---|---|
| 2013/0324848 A1* | 12/2013 | Kuroki | A61B 5/346 600/479 |
| 2015/0182141 A1 | 7/2015 | Fujita | |
| 2015/0327803 A1 | 11/2015 | Fujita et al. | |
| 2016/0367213 A1 | 12/2016 | Fujita et al. | |

FOREIGN PATENT DOCUMENTS

| | | | |
|---|---|---|---|
| JP | 2014-117425 A | 6/2014 | |
| JP | 2014-223271 A | 12/2014 | |
| JP | 2016-26516 A | 2/2016 | |
| WO | WO-2012020383 A1 * | 2/2012 | A61B 7/00 |

* cited by examiner (a) Systolic phase (b) Diastolic phase (a)

(b)

HEALTHY PERSON IN 20'S–40'S — Experimental value ······ Simulation value (a)

(b)

(a)

(b)

HEALTH MONITORING DEVICE, COMPUTER PROGRAM, RECORDING MEDIUM, AND BIOSIGNAL MEASURING DEVICE

TECHNICAL FIELD

The present invention relates to a health monitoring device that processes a trunk acoustic pulse wave propagated through the trunk of a person to estimate the health condition of the person, a computer program, a recording medium, and a biosignal measuring device suitable for capturing the trunk acoustic pulse wave.

BACKGROUND ART

In Patent Documents 1 to 4 and so on, the present inventors have proposed an art to estimate the condition of a person by capturing, in a non-constraining manner, vibration (trunk acoustic pulse wave) due to a biosignal propagated through the dorsal body surface of the trunk of the person and analyzing the vibration.

In Patent Document 1, slide calculation is performed in which a predetermined time width is set in a time-series waveform of a dorsal body surface pulse wave of around 1 Hz extracted from vibration (trunk acoustic pulse wave) due to a biosignal propagated through the body surface, to find a frequency slope time-series waveform, and from the tendency of its variation, for example, based on whether its amplitude is on the increase or on the decrease, a biological state is estimated. It is also disclosed that, by frequency analysis of the trunk acoustic pulse wave, power spectra of frequencies respectively corresponding to a function regulation signal, a fatigue reception signal, and an activity regulation signal that belong to a predetermined range from the ULF band (ultra-low-frequency band) to the VLF band (very-low-frequency band) are found, and a state of a person is determined from time-series variations of the respective power spectra.

Patent Documents 2 to 3 disclose a means for determining a homeostasis function level. For the determination, the means for determining the homeostasis function level uses at least one or more of plus/minus of a differentiated waveform of a frequency slope time-series waveform, plus/minus of an integrated waveform obtained by integrating the frequency slope time-series waveform, absolute values of frequency slope time-series waveforms obtained by absolute value processing of a frequency slope time-series waveform found by a zero-cross method and a frequency slope time-series waveform found by a peak detection method, and so on. By using the combination of these, it is found on which level the homeostasis function is. Further, Patent Document 4 discloses a sensing system (sound/vibration information collection mechanism) including a resonance layer including a natural oscillator having a natural frequency corresponding to a trunk acoustic pulse wave.

PRIOR ART DOCUMENT

Patent Document

Patent Document 1: Patent Document 1: Japanese Patent Application Laid-open No. 2011-167362
Patent Document 2: Japanese Patent Application Laid-open No. 2014-117425
Patent Document 3: Japanese Patent Application Laid-open No. 2014-223271
Patent Document 4: Japanese Patent Application Laid-open No. 2016-26516

SUMMARY OF THE INVENTION

Problems to be Solved by the Invention

The arts to estimate the biological state in Patent Documents 1 to 4 are proposed for use to mainly estimate the state of an automobile driver through the identification of a hypnagogic symptom signal, the estimation of fatigue, and so on, thereby inhibiting drowsy driving or leading the driver to a wakeful state.

The aforesaid sensing system including the natural oscillator is capable of easy and stress-free measurement of the trunk acoustic pulse wave (hereinafter referred to as APW) which is a measurement indicator for use in finding a health degree of the cardiocirculatory system. APW which contains combined information on the cardiocirculatory structure and blood is given a frequency characteristic by pressure fluctuation in a cardiac cycle and a heart rate. The feedback force of flow velocity and pressure generated in a process from blood filling to output become apical beat and heart sound. There is a possibility that, from the frequency characteristic of APW which contains the combined information on blood and blood vessels and physical characteristics found from apical beat and heart sound, comprehensive cardiocirculatory function information including the combined information on the cardiocirculatory system and blood can be inferred. In particular, apical beat is palpable vibration generated by the collision of the apex of the heart with the thoracic wall and is more suitably captured than heart sound by the sensing system using the natural oscillator. Therefore, to extract an apical beat component from a trunk acoustic pulse wave obtained from such a sensing system to determine the state enables higher accuracy analysis of the state of a person, and not only makes it possible to estimate the state of an automobile driver but also can be expected to be used in the medical field such as the determination of a health condition (for example, determination of "Normal person", "Slightly abnormal/follow-up required", "Patient with lifestyle-related disease", and "Patient with cardiac disease/circulatory disease" based on Japan Society of Ningen Dock (the criteria category revised on Apr. 1, 2018, partly changed and updated on Dec. 14, 2018).

The present invention was made in consideration of the above and has an object to provide a health monitoring device that extracts, in particular, an apical beat component from a trunk acoustic pulse wave and thus is usable also in the medical field, a computer program, and a recording medium. Its other object is to provide a biosignal measuring device that is more suitable for capturing the apical beat component than a conventional sensing system and is suitable for collecting the trunk acoustic pulse wave used in the aforesaid health monitoring device.

Means for Solving the Problems

To solve the aforesaid problem, a health monitoring device of the present invention is a health monitoring device which processes a trunk acoustic pulse wave measured from the trunk of a person to estimate a health condition of the person, the health monitoring device including:
 a left ventricular pressure waveform identifying means which finds, from the trunk acoustic pulse wave, an indicator relating to a left ventricular pressure waveform which indicates a behavior of the heart;

an apical beat component extracting means which extracts, from the trunk acoustic pulse wave, a frequency component stemming from an apical beat; and an estimating means which estimates the health condition of the person from a correlation between the indicator relating to the left ventricular pressure waveform and a vibration frequency of the frequency component stemming from the apical beat.

The estimating means may estimate the health condition from a correlation between the indicator relating to the left ventricular pressure waveform and a diastolic time interval in a cardiac cycle, the diastolic time interval indicating a magnitude of the vibration frequency of the apical beat component.

Further, a health monitoring device of the present invention is a health monitoring device which processes a trunk acoustic pulse wave measured from the trunk of a person to estimate a health condition of the person, the health monitoring device including:

a left ventricular pressure waveform identifying means which finds, from the trunk acoustic pulse wave, an indicator relating to a left ventricular pressure waveform which indicates a behavior of the heart;

an apical beat component extracting means which extracts, from the trunk acoustic pulse wave, a frequency component stemming from an apical beat; and an estimating means which estimates the health condition of the person from a correlation between the indicator relating to the left ventricular pressure waveform and blood pressure.

Preferably, the apical beat component extracting means extracts, from the trunk acoustic pulse wave, the frequency component stemming from the apical beat based on comparison with a heart sound component.

The apical beat component extracting means may extract the frequency component stemming from the apical beat, further taking a relation with a heart rate into consideration.

Preferably, the trunk acoustic pulse wave is a signal captured by a biosignal measuring device disposed on the posterior thorax of the person.

A computer program of the present invention is a computer program causing a computer to function as a health monitoring device which processes a trunk acoustic pulse wave measured from the trunk of a person to estimate a health condition of the person, the computer program causing the computer to execute:

a procedure for finding, from the trunk acoustic pulse wave, an indicator relating to a left ventricular pressure waveform which indicates a behavior of a heart;

a procedure for extracting, from the trunk acoustic pulse wave, a frequency component stemming from an apical beat; and a procedure for estimating the health condition of the person from a correlation between the indicator relating to the left ventricular pressure waveform and a vibration frequency of the frequency component stemming from the apical beat.

The means for estimating the health condition of the person may be a procedure for estimating the health condition from a correlation between the indicator relating to the left ventricular pressure waveform and a diastolic time interval in a cardiac cycle, the diastolic time interval indicating a magnitude of the vibration frequency of the apical beat component.

Further, a computer program of the present invention is a computer program causing a computer to function as a health monitoring device which processes a trunk acoustic pulse wave measured from the trunk of a person to estimate a health condition of the person, the computer program causing the computer to execute:

a procedure for finding, from the trunk acoustic pulse wave, an indicator relating to a left ventricular pressure waveform which indicates a behavior of the heart;

a procedure for extracting, from the trunk acoustic pulse wave, a frequency component stemming from an apical beat; and a procedure for estimating the health condition of the person from a correlation between the indicator relating to the left ventricular pressure waveform and blood pressure.

Preferably, in the procedure for extracting the frequency component stemming from the apical beat, the computer is caused to execute a procedure for extracting, from the trunk acoustic pulse wave, the frequency component stemming from the apical beat based on comparison with a heart sound component.

The procedure for extracting the frequency component stemming from the apical beat may extract the frequency component stemming from the apical beat, further taking a relation with a heart rate into consideration.

The present invention further provides a recording medium in which any one of the aforesaid computer programs is recorded.

Further, a biosignal measuring device of the present invention includes:

a bead foam formed in a plate shape;

a three-dimensional knitted fabric filled in a placement hole formed in the bead foam;

films pasted on surfaces of the bead foam to cover surfaces of the three-dimensional knitted fabric;

a microphone sensor disposed on an outer side of the film at a position corresponding to a position where the three-dimensional knitted fabric is disposed;

a cover film covering the microphone sensor; and a disturbance mixture inhibiting member which is in an inner side of the cover film to surround an outer side of the microphone sensor and has a function of inhibiting a disturbance from mixing.

The disturbance mixture inhibiting member is preferably a gel.

Effect of the Invention

The present invention analyzes the trunk acoustic pulse wave to estimate the health condition of a person using the correlation of the indicator relating to the left ventricular pressure waveform indicating the behavior of the heart, with the vibration frequency of the frequency component stemming from the apical beat, the diastolic time interval in the cardiac cycle, or the blood pressure. The former is input information and the latter is output information in the heart through which blood circulates. Therefore, comparing these two pieces of information makes it possible to know the health condition relating to the function of the heart more accurately than conventionally. Further, the left ventricular pressure waveform can also be formed from the frequency component stemming from the apical beat, and therefore, according to the present invention, it is possible to easily estimate the health condition by finding the frequency component stemming from the apical beat. Therefore, the present invention is suitable for use in the medical field such as a medical checkup.

Further, in the biosignal measuring device of the present invention, the microphone sensor is disposed outside the three-dimensional knitted fabric functioning as the natural oscillator and is surrounded by the disturbance mixture inhibiting member. A conventional sensing system in which a microphone sensor is also disposed in a placement hole for a natural oscillator formed of a three-dimensional knitted fabric is configured to capture a signal amplified by the three-dimensional knitted fabric (natural oscillator), but the biosignal measuring device of the present invention captures a signal solid-propagated through the three-dimensional knitted fabric (natural oscillator). Therefore, a specific frequency component of a weak input vibration signal is amplified by stochastic resonance during the solid-propagation process, and the resultant is captured. As a result, not only heart sound but also an apical beat component can be more surely captured, and thus the biosignal measuring device of the present invention is suitable as a device to collect the trunk acoustic pulse wave used in the health condition estimating device of the present invention using the information on the apical beat component.

MODES FOR CARRYING OUT THE INVENTION

Figure 1:
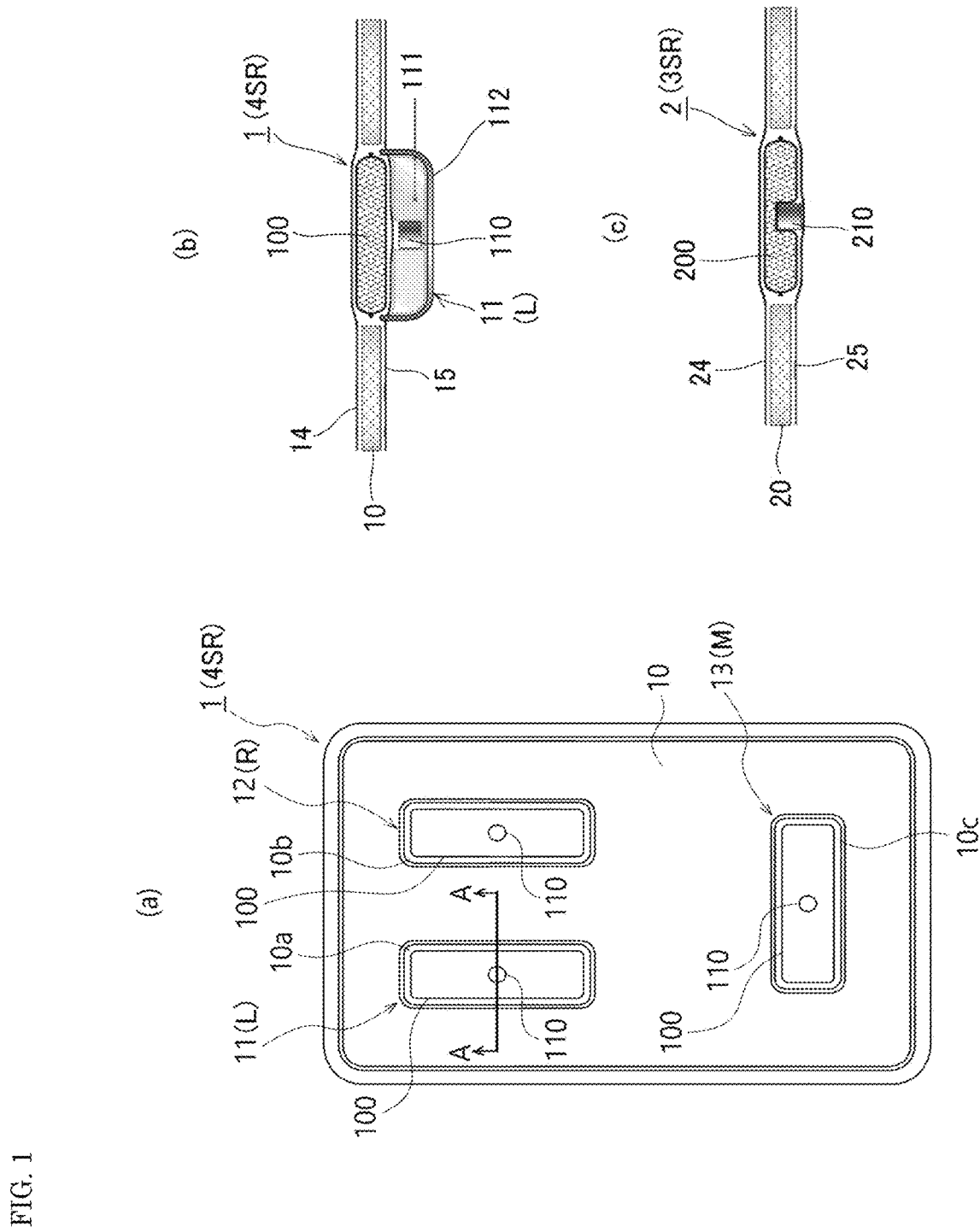
FIG. 1(a) is a plan view of a biosignal measuring device (4SR) according to one embodiment of the present invention.
FIG. 1(b) is a sectional view taken along the A-A line in FIG. 1(a).
FIG. 1(c) is a sectional view of a conventional biosignal measuring device (3SR).

The present invention will be hereinafter described in more detail based on an embodiment of the present invention illustrated in the drawings. FIGS. 1(a), (b) are explanatory views of a biosignal measuring device 1 used in this embodiment. As illustrated in FIG. 1(a), in the biosignal measuring device 1, three biosignal detection units, namely, a left upper part biosignal detection unit 11, a right upper part biosignal detection unit 12, and a lower part biosignal detection unit 13 are provided on a base member 10.

The base member 10 is made of a plate-shaped body having an area large enough to include the three biosignal detection units 11 to 13 and cover a range from the thorax to the abdomen of a person. It is preferably formed of a material such as a flexible synthetic resin that gives only a small uncomfortable feeling when the back of the person abuts thereon and is more preferably formed of a bead foam. Thin films of beads forming the bead foam vibrate by sensitively responding to body surface microvibration that is based on biosignals, to easily propagate the biosignals to the biosignal detection units 11 to 13.

Figure 2:
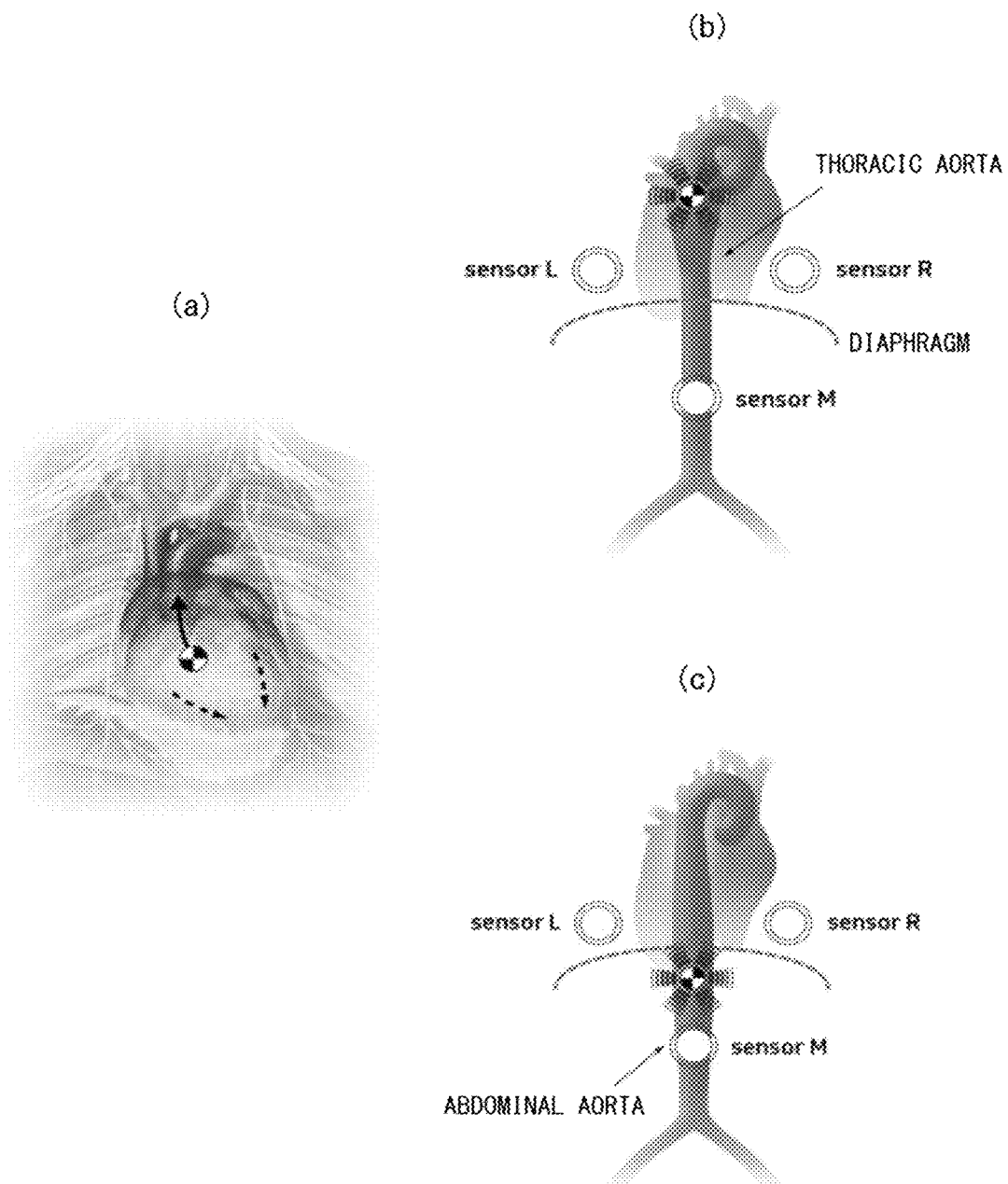
FIG. 2(a) is a view illustrating an image of blood flow, which is indicated by the arrows, accompanying an apical beat, and FIGS. 2(b), (c) are views illustrating placement positions of a left upper part biosignal detection unit (sensor L), a right upper part biosignal detection unit (sensor R), and a lower part biosignal detection unit (sensor M) together with the state of arterial pulsation.

Specifically, in the state in which the base member 10 is disposed along the back of the person, upper two placement holes 10a, 10b have a substantially rectangular shape that is long in the up-down direction and are provided at positions 6 cm leftward and rightward from the median line of the thorax (back) of an adult male and corresponding to the position of his fifth intercostal space (positions indicated by sensor L and sensor R in FIGS. 2(b), (c)). A lower placement hole 10c is provided at a position corresponding to the position of the third to fourth lumbar vertebrae of an adult male and has a substantially rectangular shape that is long in the left-right direction (position indicated by sensor M in FIGS. 2(b), (c)).

Three-dimensional knitted fabrics 100 are disposed in the aforesaid three placement holes 10a, 10b, 10c respectively, and films 14, 15 are stacked on surfaces of the base member 10 to cover the front and rear surfaces of the three-dimensional knitted fabrics 100. Microphone sensors 110 are disposed at positions that are on the outer side of the film 15 located opposite the human body and correspond to the placement holes 10a, 10b, 10c. Gels (silicon gels) 111 as disturbance mixture inhibiting members are disposed to surround the outer sides of the respective microphone sensors 110, and cover films 112 whose peripheral edges are fixed to the film 15 are further provided to cover the outer sides of the gels 111 (see FIG. 1(b)). As a result, the three-dimensional knitted fabric 100 placed in the placement hole 10a on the left of the median line, and the microphone sensor 110, the gel 111, and the cover film 112 which are provided on the outer side of the film 15 so as to face this three-dimensional knitted fabric 100 form the biosignal detection unit 11 on the left of the median line. The three-dimensional knitted fabric 100 placed in the placement hole 10b on the right of the median line, and the microphone sensor 110, the gel 111, and the cover film 112 which are provided on the outer side of the film 15 so as to face this three-dimensional knitted fabric 100 form the biosignal detection unit 12 on the right of the median line. The three-dimensional knitted fabric 100 placed in the lower placement hole 10c, and the microphone sensor 110, the gel 111, and the cover film 112 which are provided on the outer side of the film 15 so as to face this three-dimensional knitted fabric 100 form the biosignal detection unit 13 disposed at the lower middle position. The biosignal detection unit 11 on the left (hereinafter, referred to as "microphone sensor L" in some cases) is capable of mainly capturing APW stemming from heart sound, apical beat, and the thoracic aorta, and the biosignal detection unit 13 at the lower middle position (hereinafter, referred to as "microphone sensor M" in some cases) is capable of mainly capturing APW stemming from heart sound, apical beat, and the abdominal aorta. The biosignal detection unit 12 on the right (hereinafter, referred to as "microphone sensor R" in some cases) is a compensation sensor.

The three-dimensional knitted fabric 100 is formed of a pair of ground knitted fabrics disposed apart from each other and connecting yarns connecting the ground knitted fabrics as is disclosed in the aforesaid Patent Document 1. For example, the ground knitted fabrics each can be formed to have a flat knitted fabric structure (fine meshes) continuous both in a wale direction and a course direction using yarns of twisted fibers or to have a knitted fabric structure having honeycomb (hexagonal) meshes. The connecting yarns impart certain rigidity to the three-dimensional knitted fabric so that one of the ground knitted fabrics and the other ground knitted fabric are kept at a predetermined interval. Therefore, applying tension in the planar direction makes it possible to cause string vibration of the yarns of the facing ground knitted fabrics forming the three-dimensional knitted fabric or of the connecting yarns connecting the facing ground knitted fabrics. Accordingly, cardio-vascular sound/vibration being a biosignal causes the string vibration and is propagated in the planar direction of the three-dimensional knitted fabric. The three-dimensional knitted fabric 100 of this embodiment functioning as a natural oscillator has a 13 mm thickness.

In the biosignal detection units 11 to 13, the microphone sensors 110 are disposed outside the three-dimensional knitted fabrics 100, which are the natural oscillators, and are surrounded by the disturbance mixture inhibiting members constituted by the gels 111. Therefore, the biosignal measuring device 1 of this embodiment causes the solid propagation of a weak trunk acoustic pulse wave propagated from the body surface and is capable of amplifying a specific frequency component by stochastic resonance during this process to capture the resultant.

Here, a performance test conducted for the confirmation of the performance of the biosignal measuring device 1 of this embodiment will be described. Further, this will be described in comparison with a biosignal measuring device 2 in which a three-dimensional knitted fabric 200 and a microphone sensor 210 are both placed in each placement hole of a bead foam 20 and their outer sides are covered with films 24, 25, which is illustrated in FIG. 1(c) and described in the Background Art section. In the below, the biosignal measuring device 1 of this embodiment will be referred to as 4SR, its microphone sensor 110 will be referred to as an outer microphone because of its placement form, the conventional biosignal measuring device 2 will be referred to as 3SR, and its microphone sensor 210 will be referred to as an inner microphone because of its placement form. Further, in both cases, output data of only the biosignal detection unit 11 on the left of the median line (microphone sensor L) is used.

Figure 3:
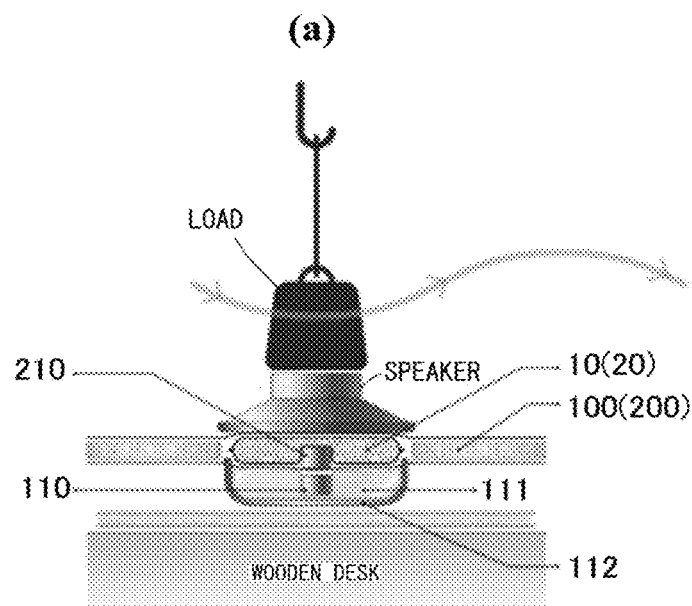
FIG. 3(a) is an explanatory view of a method of testing the performances of the biosignal measuring device (4SR) according to the embodiment and the conventional biosignal measuring device (3SR) according to a comparative example.
FIG. 3(b) is a chart illustrating the characteristics of an input signal of a speaker used in the performance test.
Figure 3:
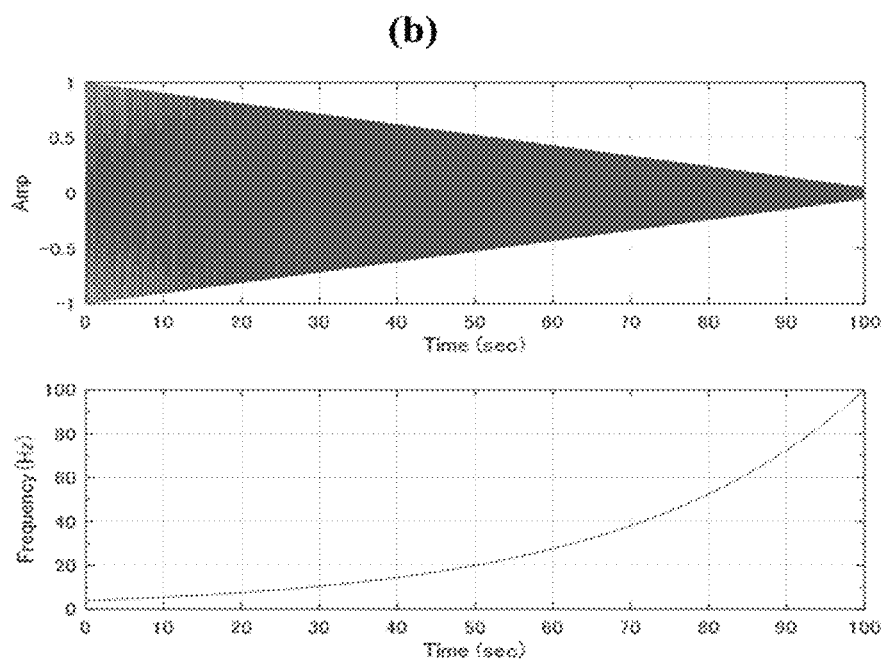

FIG. 3(a) illustrates an experiment method for calculating an output signal-to-noise ratio (hereinafter, referred to as SNR). An external sound source is a speaker, and the mass of the speaker is 0.4 kg. The maximum load value applied to the microphone sensors 110, 210 was 19 N which was a load value when a deflection was 13 mm in a dorsal-trunk load-deflection characteristic obtained using a ϕ98 pressing plate, and the experiment was conducted under two load conditions where the load was the weight 4 N of the speaker and where the load was the total weight 19 N of the speaker and the weight.

An input signal generated by the speaker is a log sweep waveform of 4 to 1000 Hz illustrated in FIG. 3(b). The inner microphone (microphone sensor 210) of 3SR captures a signal (noise) resulting from the amplification of an original input, that is, the speaker signal by the 3D net. The outer microphone (microphone sensor 110) of 4SR captures solid-propagated sound which is the trunk acoustic pulse wave amplified by stochastic resonance.

Figure 4:
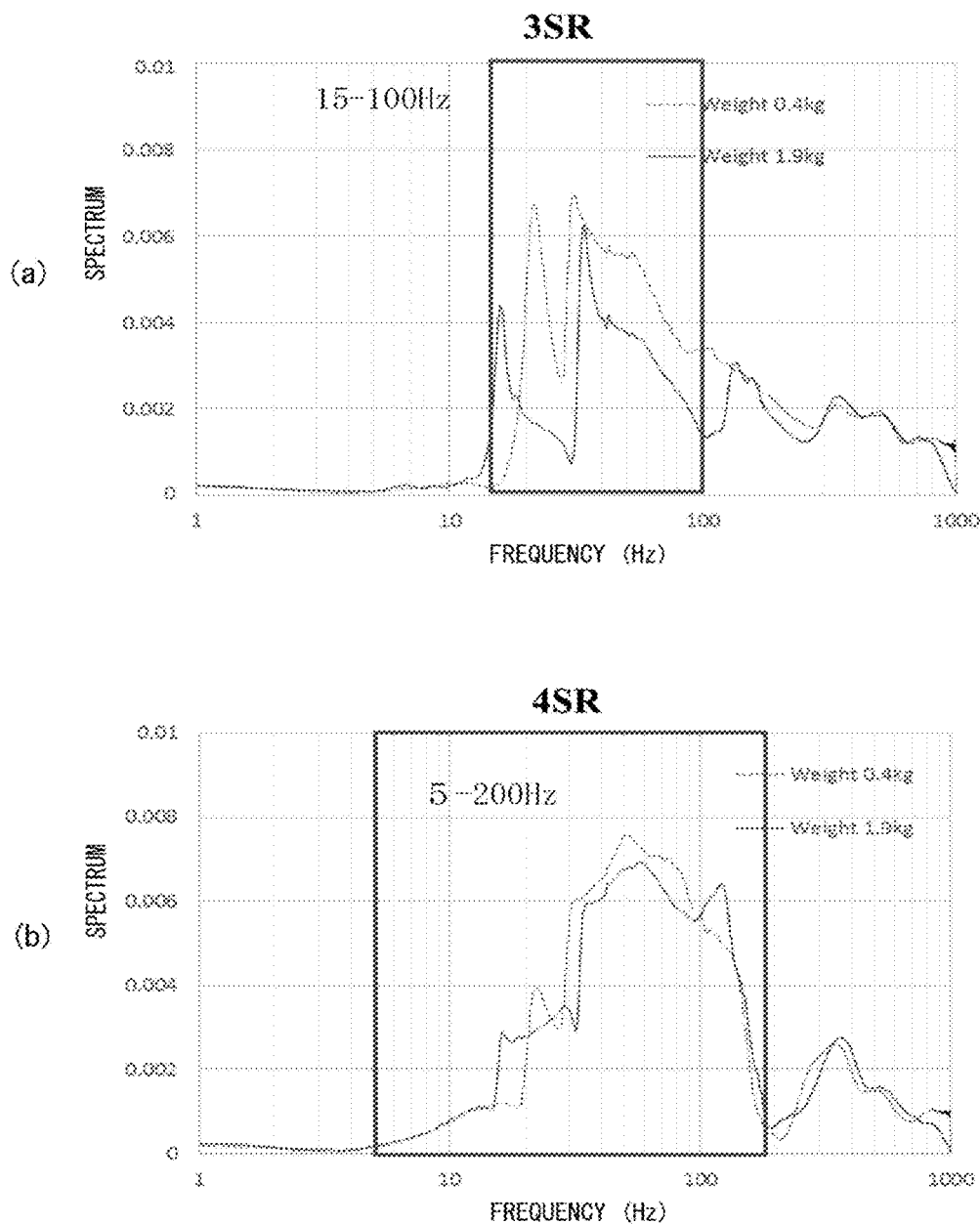
FIG. 4(a) is a chart illustrating the power spectra of an inner microphone in the biosignal measuring device (3SR) according to the comparative example.
FIG. 4(b) is a chart illustrating the power spectra of an outer microphone in the biosignal measuring device (4SR) according to the embodiment.

FIG. 4(a) illustrates the power spectra of the inner microphone (microphone sensor 210) measured using 3SR. 3SR amplifies input signals of 15 to 100 Hz. Signals of 15 Hz or lower and signals of 100 Hz or higher are attenuated by a mechanical filter of 3SR.

On the other hand, 4SR amplifies input signals of 5 to 200 Hz with the maximum value present at 50 Hz as illustrated in FIG. 4(b). FIG. 5(a) illustrates responsivity SNR of the frequency band of 4SR to input noise intensity. The stochastic resonance phenomenon appeared in 10 to 20 Hz, 20 to 30 Hz, and 35 to 100 Hz.

FIG. 5(a) illustrates biosignal groups $1_{PCG}$, $2_{PCG}$, $3_{PCG}$ captured from the anterior thorax of the trunk by a phonocardiography microphone (hereinafter, referred to as PCG). There are three peaks between 10 and 20 Hz, and high-order components appeared between 20 and 40 Hz.

FIG. 5(b) illustrates the biosignals captured from the anterior thorax by PCG and biosignals captured from the anterior and posterior thoraxes by 4SR. From PCG on the anterior thorax, biosignals of 1 to 300 Hz were obtained. The biosignals measured from the anterior and posterior thoraxes using 4SR are different in power. $3_{4SR:F}$ captured by 4SR placed on the anterior thorax had the same frequency as that of frequency groups of $3_{PCG}$ captured by PCG and its power was large and thus was inferred as being heart sound.

The biosignals $1_{PCG}$, $1_{4SR:L}$, $1_{4SR:F}$, $2_{4SR:L}$, $2_{4SR:F}$ captured by PCG and 4SR are considered as biosignals other than heart sound and are considered as apical beat components. It was inferred that an apical beat is a low-frequency component because it is generated by the collision of the apex of the heart with the thoracic wall and is palpable. A heart sound component which is a turbulence and a water hammer wave is a high-frequency component that can be heard using a stethoscope. Further, heart sound components include N-order and 1/N-order components, and the N-order and 1/N-order components are discerned from fractality. However, in the case where a heart rate is low as in athlete's heart, a diastolic time interval is long and an apical beat may mix in the frequencies of the heart sound. The chart corresponds to this case, and $2_{4SR:L}$, $2_{4SR:F}$ were considered as apical beat components and $1_{PCG}$, $1_{4SR:L}$, $1_{4SR:F}$ were considered as 1/N-order components of the heart sound.

FIG. 6(a) is a line-graph representation of the biosignals captured by 4SR. The powers of $1_{4SR:L}$, $1_{4SR:F}$ are the same irrespective of the difference in the sensor arrangement and they are considered as having been amplified by stochastic resonance. $1_{4SR:L}$, $1_{4SR:F}$ of 8 to lower than 14 Hz are 1/N-order components of the heart sounds $3_{4SR:L}$, $3_{4SR:F}$ of 18 to lower than 30 Hz, and $2_{4SR:L}$, $2_{4SR:F}$ are frequency components as a basis of apical beat.

FIG. 6(b) is an enlarged log-log representation of the biosignals of PCG and 4SR. It is recognized, from the number of frequency groups and shapes of waveforms, that $1_{PCG}$, $1_{4SR:L}$, $1_{4SR:F}$ of 8 to lower than 14 Hz have fractality, and were considered as 1/N-order components of $3_{PCG}$, $3_{4SR:L}$, $3_{4SR:F}$ of 18 to lower than 30 Hz. In the power spectra of $2_{4SR:L}$, $2_{4SR:F}$ of 14 to lower than 17 Hz, that captured from the posterior thorax is larger than that captured from the anterior thorax, and they are considered as solid-propagated apical beat components. The anterior apical beat component which becomes largest at the thoracic wall at a position that is on the left fifth intercostal space and about 10 cm away from the thoracic median line had substantially the same power spectrum value as that of the solid-propagated heart sound captured from the anterior part. This has led to the conclusion that the power spectra of $3_{PCG}$, $3_{4SR:L}$, $3_{4SR:F}$ of 18 to lower than 30 Hz stem from the heart sound, $1_{PCG}$, $1_{4SR:L}$, $1_{4SR:F}$ of 8 to lower than 14 Hz are 1/N-order components of the heart sound, and the power spectra of $2_{PCG}$, $2_{4SR:L}$, $2_{4SR:F}$ of 14 to lower than 17 Hz are those of the apical beat components.

In the sensing system using 4SR which performs the measurement from the posterior thorax, the weight of a subject in the sitting posture and in the lying posture is applied to 4SR, and this sensing system employs a tonometry method that keeps balance by the posture and sensor placement at the measurement time. This is a measuring systemless stressful to a person. On the other hand, placing 4SR on the anterior thorax necessitates giving pressure to the sensor main body. Further, the pressure given to the sensor is also applied to the person. Therefore, though non-invasive, this system gives a constrained feeling to the person. Further, in the case where PCG is used, it needs to be placed directly on the skin and is basically wearable. Therefore, the biological measurement from the posterior thorax using 4SR is considered optimum for the stress-free monitoring of the daily life of a subject.

(Method of Extracting Apical Beat Component by 4SR)

Figure 7:
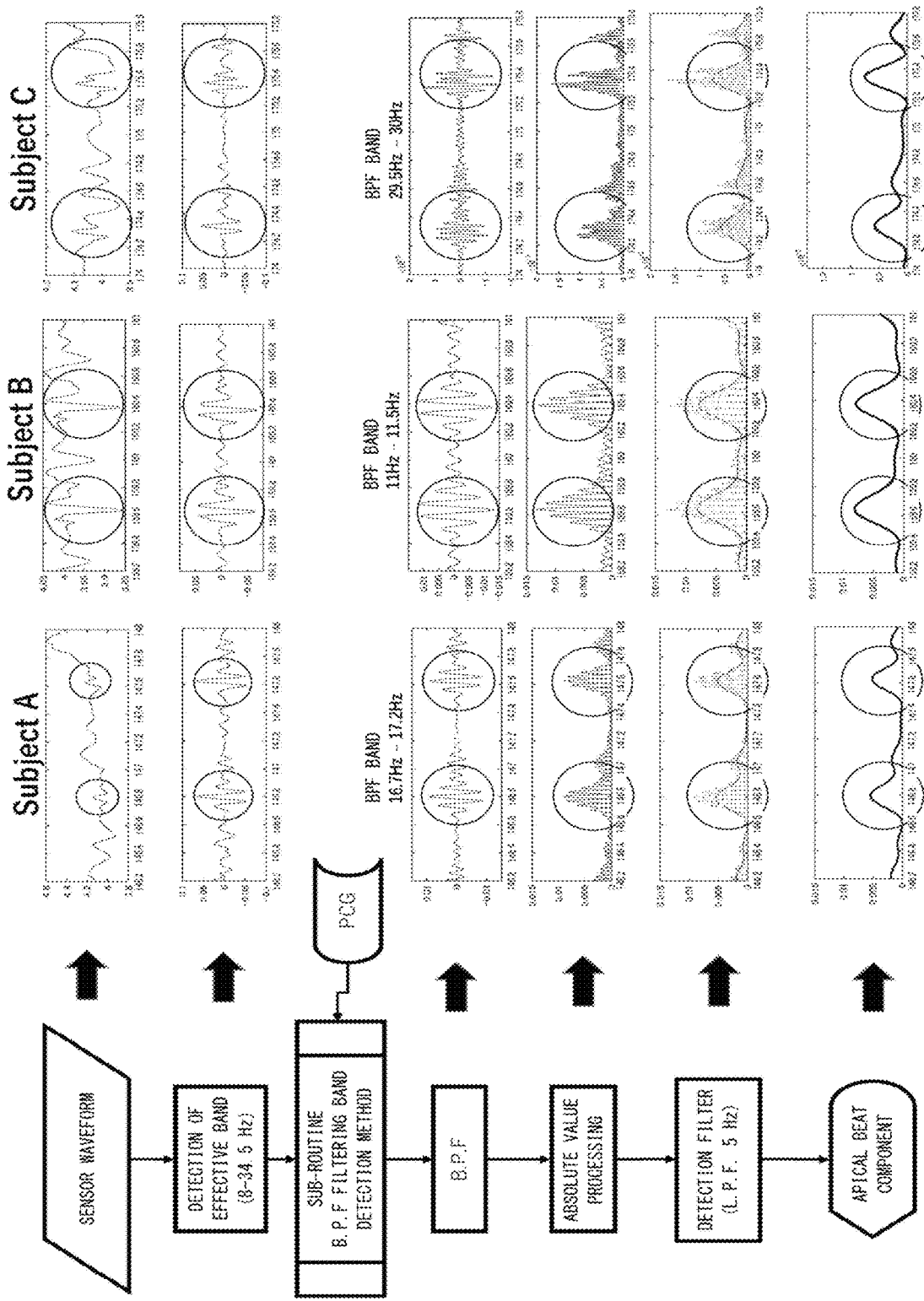
FIG. 7 is a chart illustrating waveforms in processing stages up to the extraction of apical beat components from sensor waveforms of the biosignal measuring device (4SR) according to the embodiment, regarding three subjects in their twenties having different heart rates and blood pressure values.

FIG. 7 illustrates waveforms in processing stages up to the extraction of apical beat components from sensor waveforms of 4SR, regarding three subjects in their twenties having different heart rates and blood pressure values. The subject A has a 75/min heart rate, has a 105/65 mmHg blood pressure value, is 175 cm tall, and weighs 65 kg. The subject B has an 81/min heart rate, has a 109/70 mmHg blood pressure value, is 160 cm tall, and weighs 53 kg. The subject C has a 57/min heart rate, has a 114/70 mmHg blood pressure value, is 171 cm tall, and weighs 63 kg. Note that the subject C is a sportsman who constantly plays sports and has excellent endurance/stamina. From their appearances, no great difference is recognized among the three subjects except the height.

Figure 8:
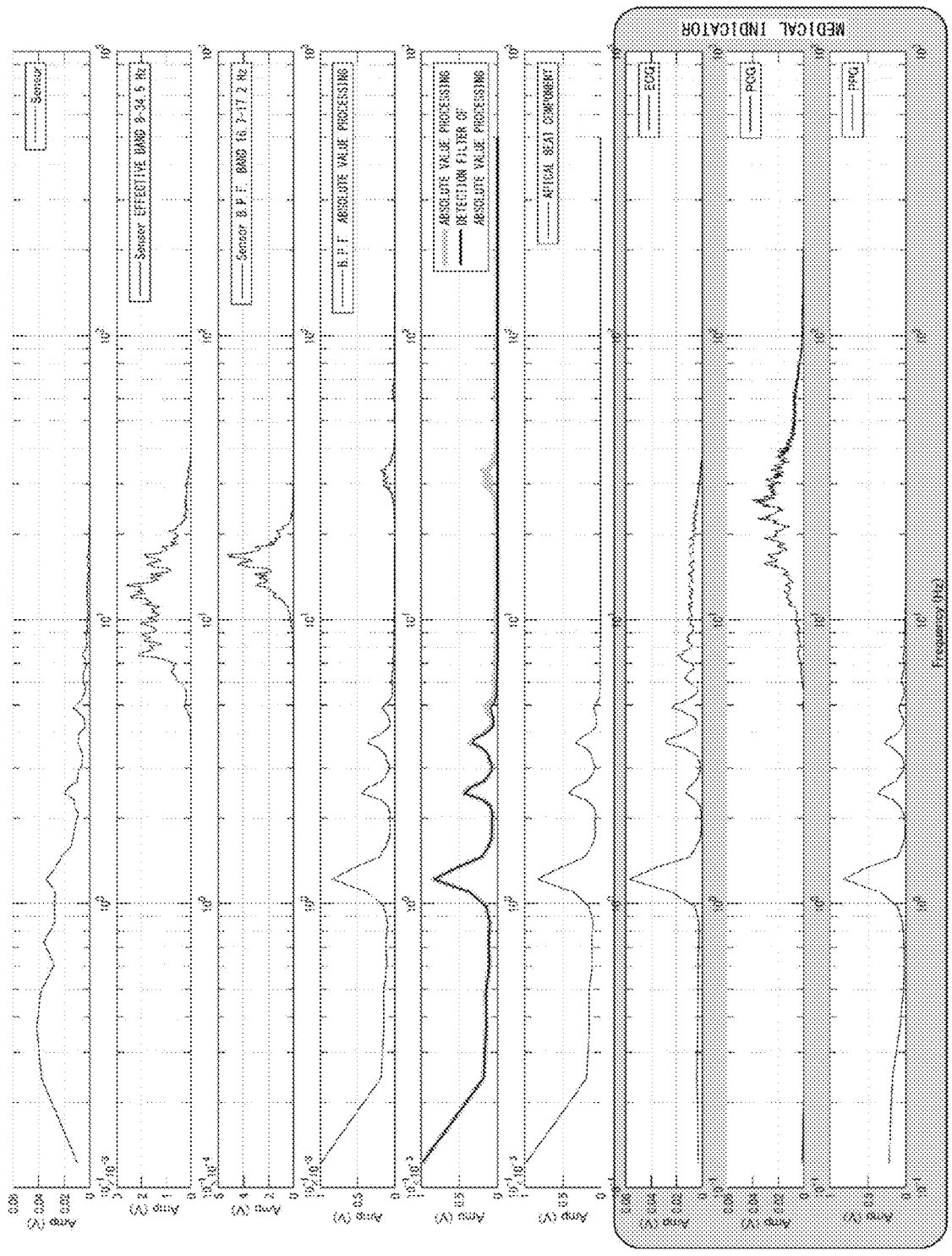
FIG. 8 is a chart illustrating medical indicators and frequency analysis results in the processing stages of a signal waveform measured by the biosignal measuring device (4SR) according to the embodiment.

FIG. 8 illustrates medical indicators and frequency analysis results in the processing stages of a signal waveform measured by 4SR. From the frequency analysis result of an electrocardiogram, it is shown that RRI's are characteristically extracted in the frequency analysis result of the signal waveform measured by 4SR. The frequency analysis result of heart sound shows that heart sound is a group of signals of 10 to 100 Hz. From the frequency analysis result of a finger plethysmogram, it is shown that the frequency analysis result of the signal waveform measured by 4SR has information on a low-frequency band in an amount equal to or more than that of the electrocardiogram, and has information on the apical beat component in an amount equivalent to that of the finger plethysmogram. It is shown that, in the frequency analysis results of 4SR in the processing stages, the information is narrowed down.

Figure 9:
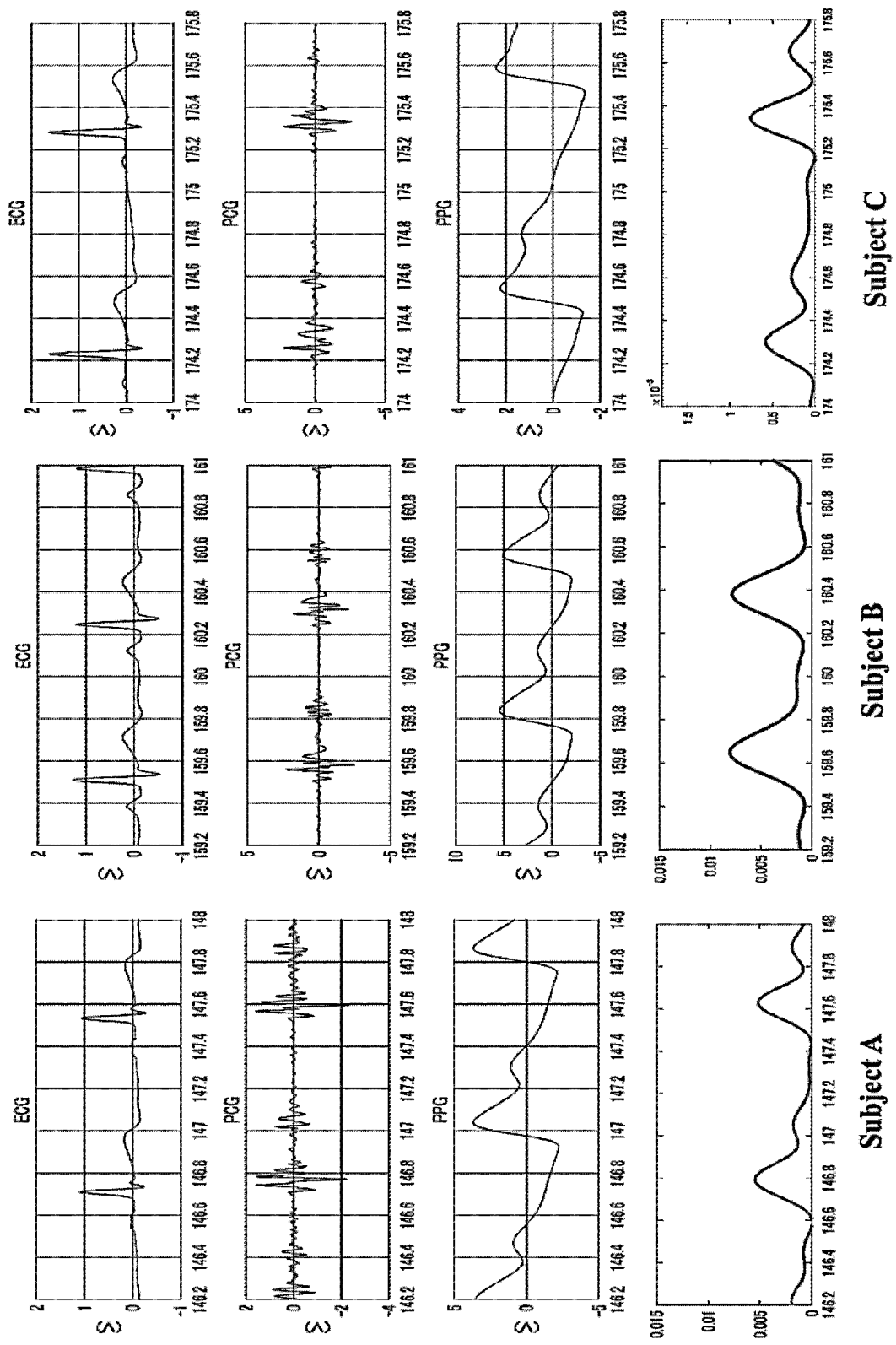
FIG. 9 is a chart illustrating time-series data of electrocardiograms/phonocardiograms/finger plethysmograms and apical beat components.

FIG. 9 illustrates time-series data of electrocardiograms/phonocardiograms/finger plethysmograms and apical beat components. In the electrocardiogram of the subject B, P waves appear highly pointed. Having no symptom of short breath or respiratory difficulty due to exercise, the subject B is considered as a normal subject not having a loaded right atrium but having a good autonomic nervous function. The differences among the waveforms of the finger plethysmograms of the subjects A, B, and C are due to differences in heart rate and pulse wave velocity, and the three subjects are considered as young people each having a normal blood pressure and a normal hardness of the arterial wall.

Figure 5:
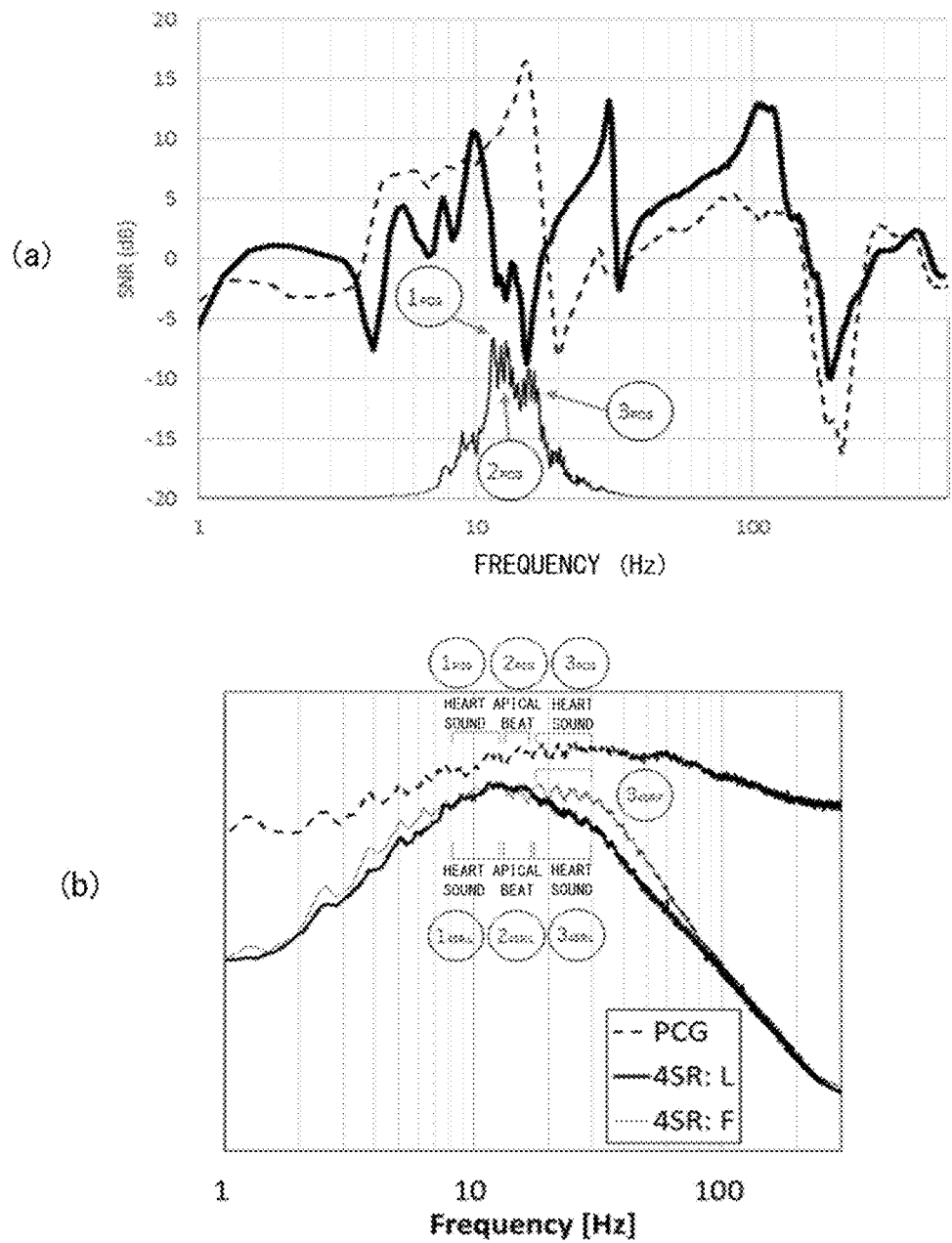
FIG. 5(a) is a chart illustrating SNR of the biosignal measuring device (4SR) according to the embodiment.
FIG. 5(b) is a logarithmic representation of frequency components of apical beat and heart sound.
Figure 6:
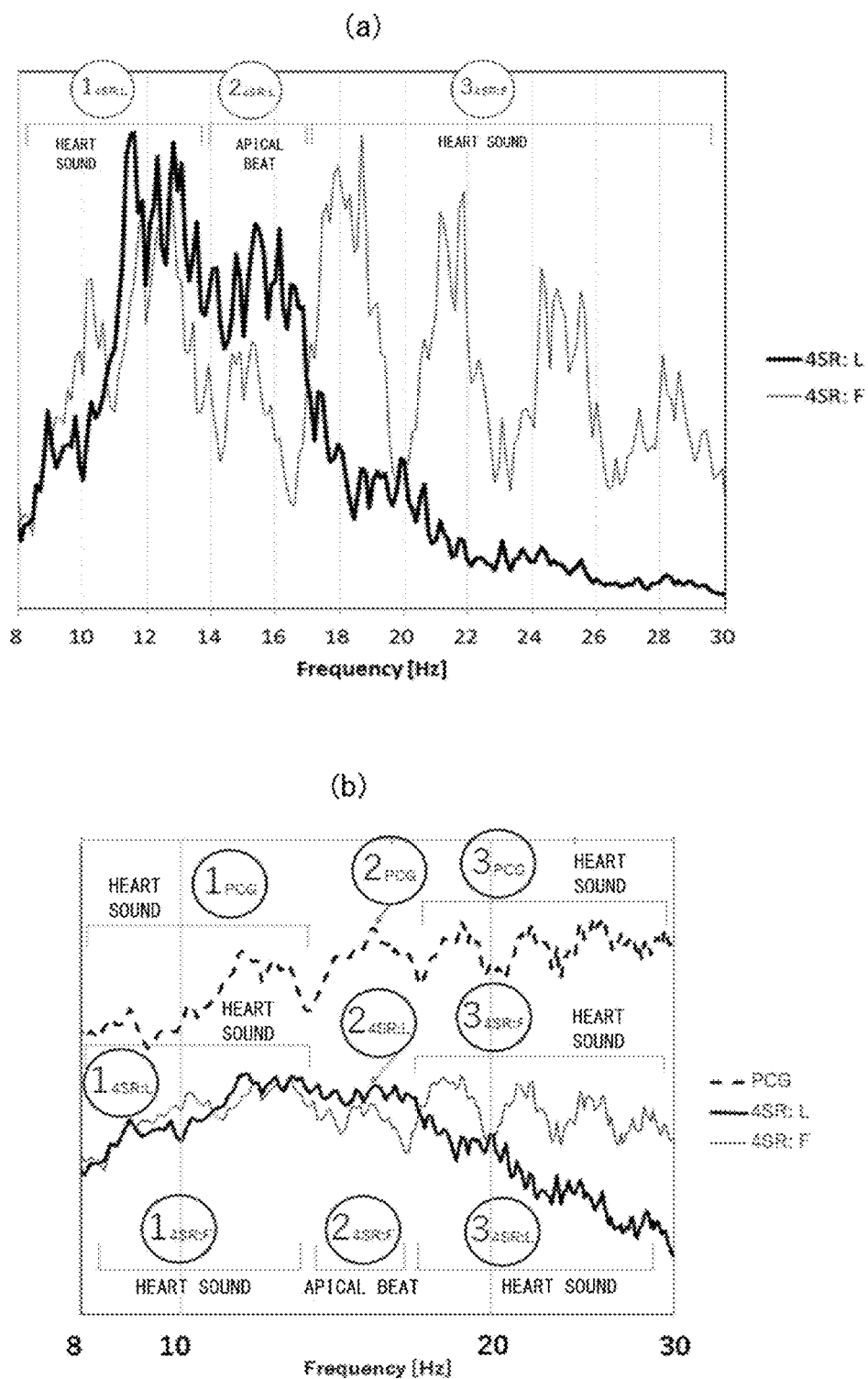
FIG. 6(a) is a line graph representation of biosignals captured by the biosignal measuring device (4SR) according to the embodiment.
FIG. 6(b) is an enlarged log-log representation of a phonocardiogram and the biosignals obtained by the biosignal measuring device (4SR) according to the embodiment.
Figure 10:
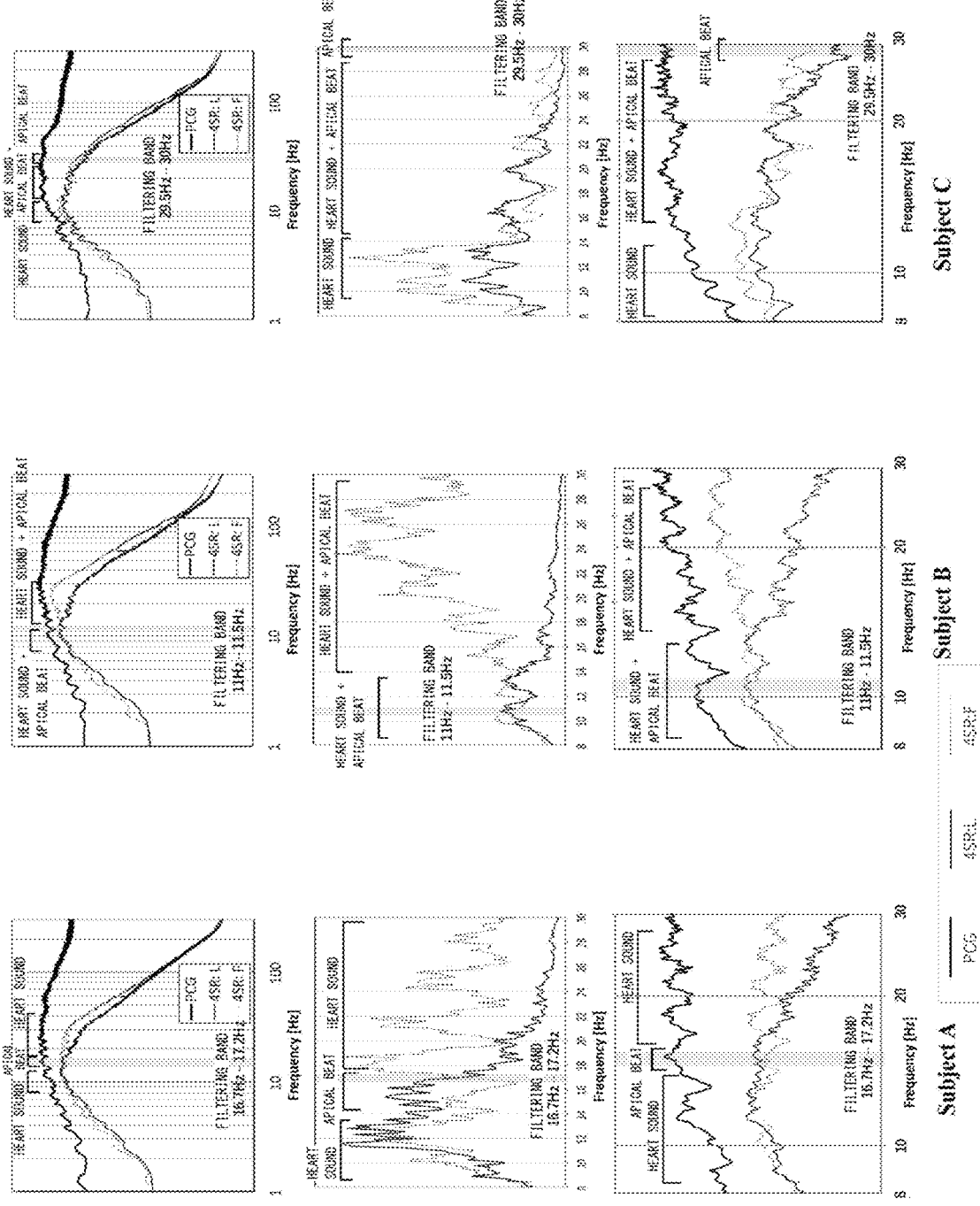
FIG. 10 is a chart illustrating processes of finding frequency bands of heart sounds and apical beats of the subjects A, B, C.

FIG. 10 illustrates the process of narrowing down the information according to the procedures illustrated in FIG. 5 and FIG. 6, and in the charts, the frequency bands of heart sound and apical beat of the subjects are shown. The heart sound was composed of various frequency components, and the apical beat includes one to two peaks. The apical beat components and the heart sound components of the subject A are in discrete frequency bands, and the heart sound components and the apical beat components of each of the subjects B, C are mixed. Here, itis seen that a method to mechanically find the frequency of the apical beat component is necessary to reduce a determination variation. Next, this will be described.

(Physical Characteristics of Waveforms Extracted by 4SR)

Figure 11:
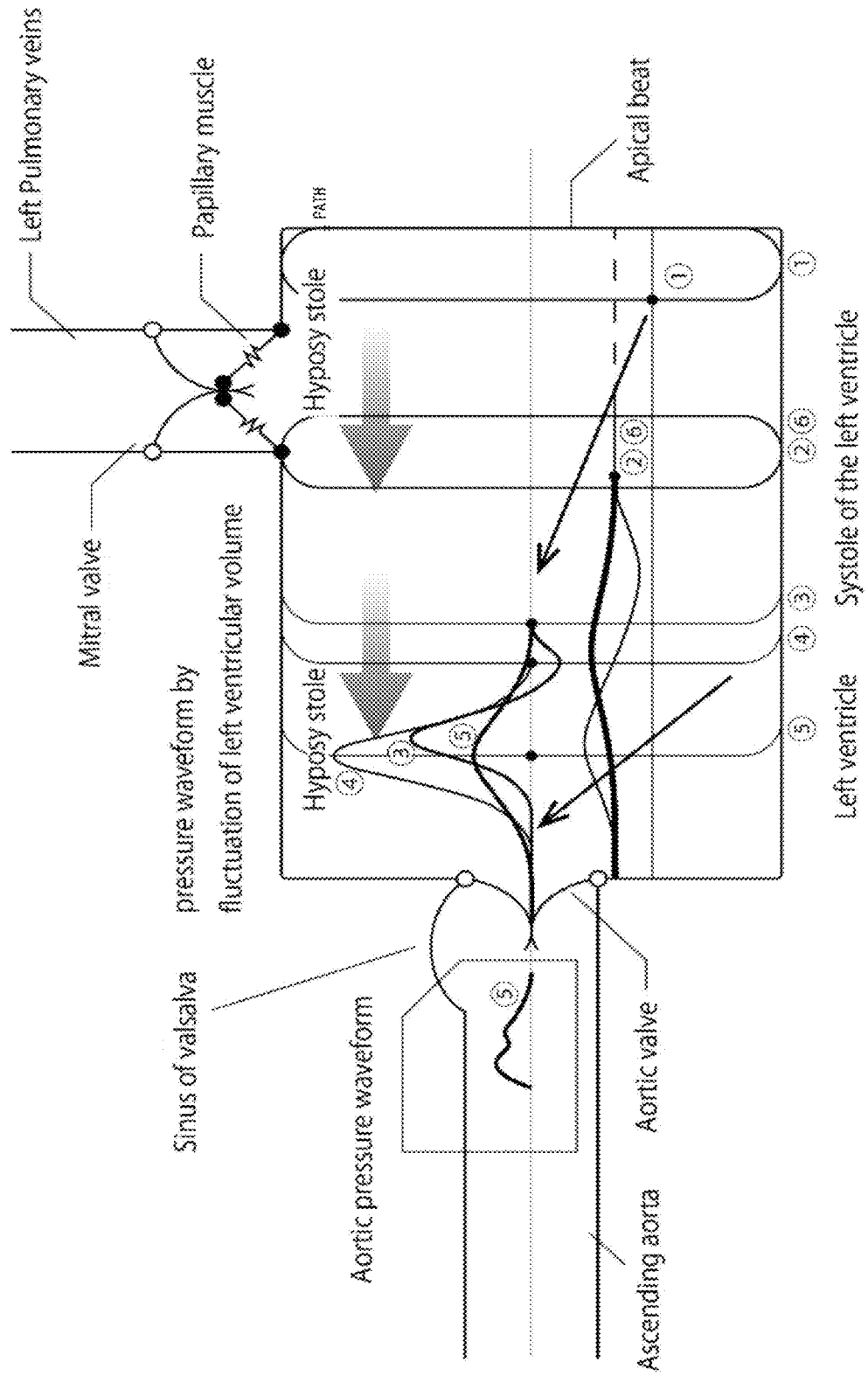
FIG. 11 is a model diagram of a volume change and a pressure change of the cardiac structure system during a cardiac cycle.
Figure 12:
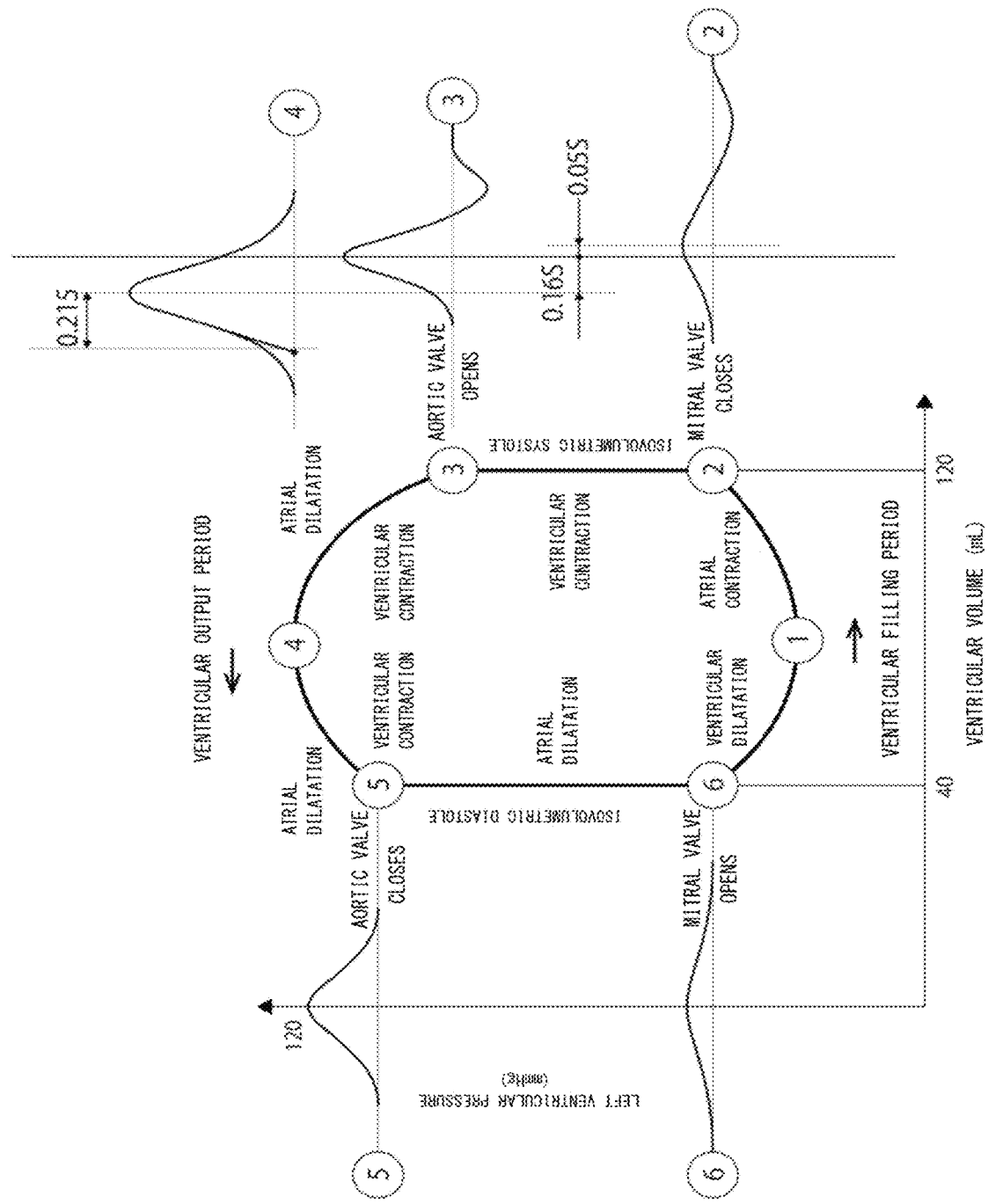
FIG. 12 is a chart in which pressure fluctuation occurring in the left ventricle during the cardiac cycle is illustrated with a pressure-volume loop of the left ventricle of a person.

Apical beat and heart sound are the feedback force of a phenomenon caused by the combination of water hammer wave and the cardiac structure system. Apical beat is palpable vibration and heart sound is sound of up to 100 Hz that can be heard using a stethoscope. FIG. 11 illustrates a model diagram of a volume change and a pressure change of the cardiac structure system during a cardiac cycle. FIG. 12 is a chart in which pressure fluctuation occurring in the left ventricle during the cardiac cycle is illustrated with a pressure-volume loop of the left ventricle of a person.

The pressure fluctuation waveform in FIG. 11 and FIG. 12 is defined by a hyperbolic function, and a general solution of a wave equation thereof is the following equation (1):

$$u(t, x) = \phi(x - ct) + \phi(x - c(t + \alpha)) = \frac{c}{2}\text{sech}^2\left(\frac{\sqrt{c}}{2}(x - ct)\right) + \frac{c}{2}\text{sech}^2\left(\frac{\sqrt{c}}{2}(x - c(t + \alpha))\right)$$

[In the equation, the C value is a constant given by flow velocity and pressure and is an indicator of the left ventricular pressure waveform indicating the behavior of the heart.]

It is generally known that, even if a heart rate increases, the ventricular diastolic filling time is kept sufficient, and even if the systolic time interval shortens, a contraction rate increases owing to contractility regulation by the sympathetic nerves and a sufficient amount of blood is pumped out. Further, a reduction in cardiac output results in a reduction in the diastolic filling time. The reduction in the ventricular diastolic filling time is compensated by an increase in atrial contractility by the sympathetic nerves, resulting in an increase in the ventricular filling.

Figure 13:
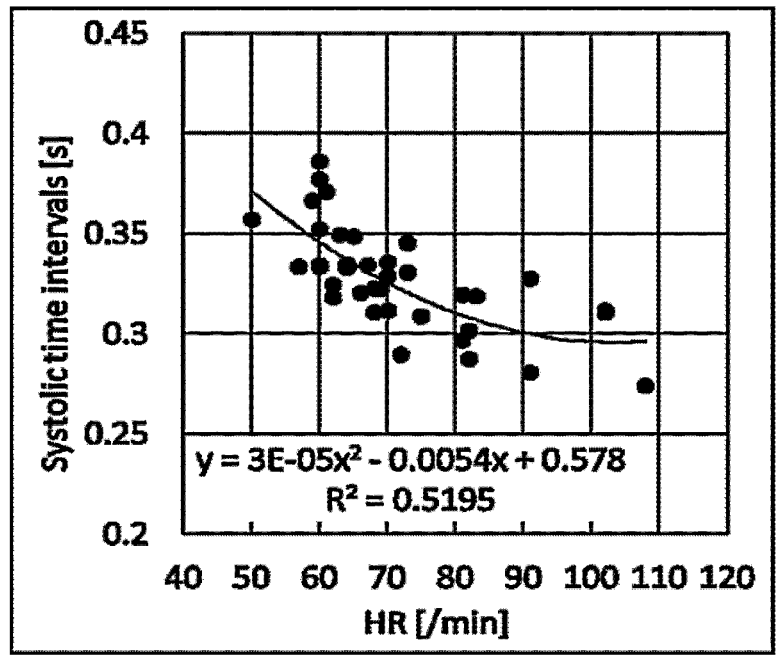
FIG. 13(a) is a chart illustrating a relation of systolic time interval with heart rate in a resting and sitting state.
FIG. 13(b) is a chart illustrating a relation of diastolic time interval with heart rate.
Figure 13:
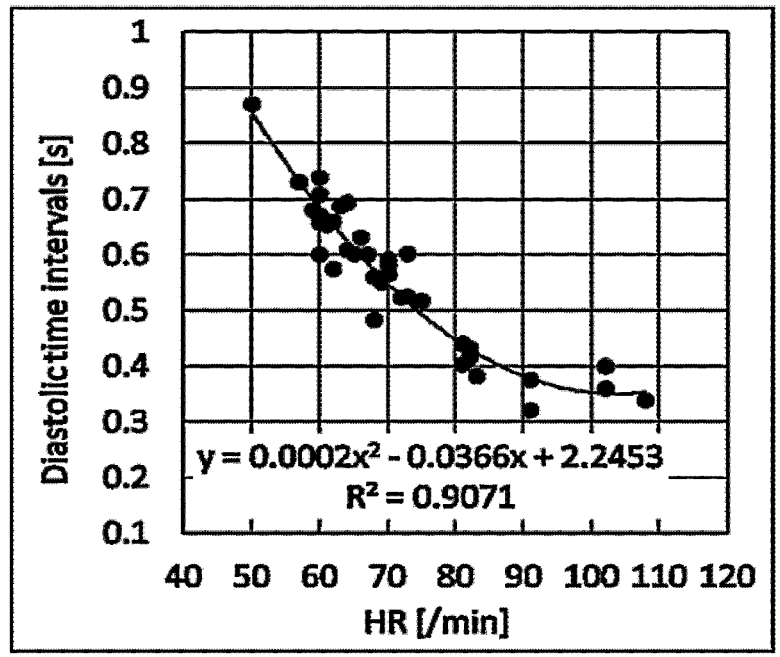
Figure 14:
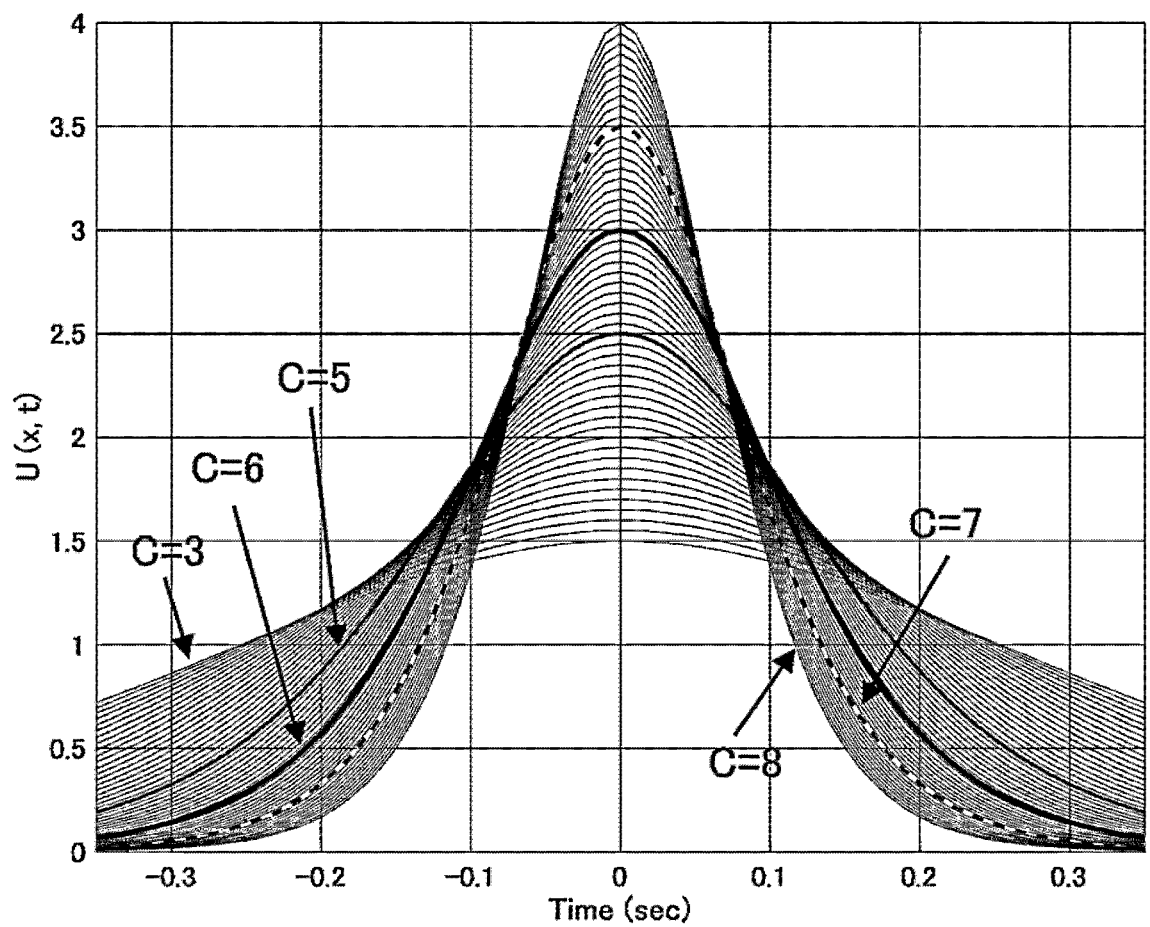
FIG. 14 is a chart illustrating particular solutions of a hyperbolic function.

FIG. 13(a) illustrates a relation of systolic time interval with heart rate when a subject in a resting and sitting state. FIG. 13(b) illustrates a relation of diastolic time interval with heart rate. As illustrated in FIGS. 13(a), (b), even if the heart rate exceeds 100/min, the systole and the diastole each have a 0.3 second time interval when the subject is in the resting and sitting posture. Here, FIG. 14 illustrates particular solutions when X=0 and t=±0.35 seconds such that a first derivative tangent is t=not more than 0.175 seconds nor less than ±0.15 seconds when C=10. Note that C is a constant given by flow velocity and pressure and in this chart, C=3 to 8 are shown.

Figure 15:
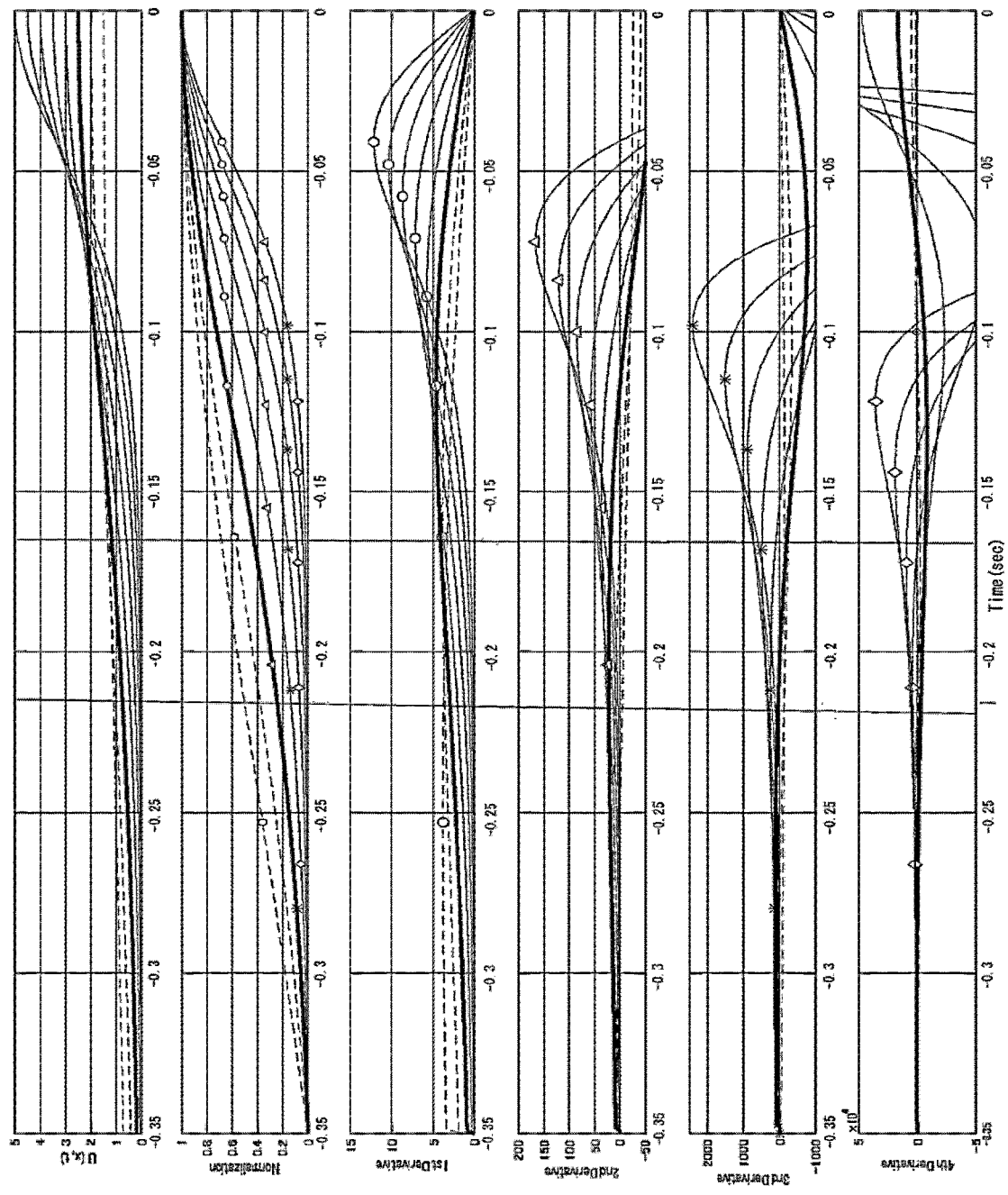
FIG. 15 is an explanatory chart of a method of finding a boundary value of linearity and nonlinearity of C values of the particular solutions by a graphical solution.
Figure 16:
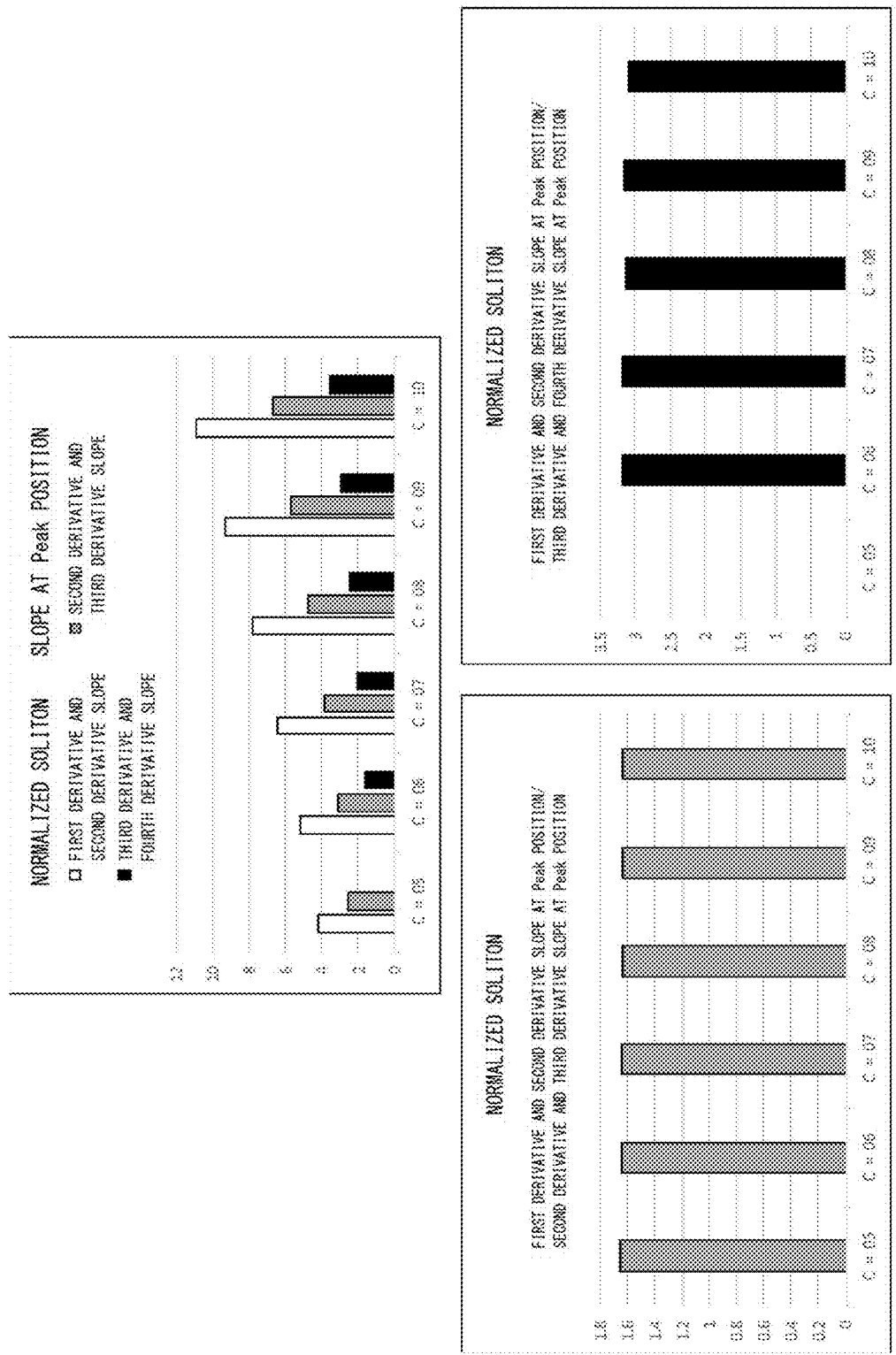
FIG. 16 is a bar-graph representation of slopes corresponding to respective C values.

To find a boundary value of linearity and non-linearity of the C values of the particular solutions by a graphical solution, FIG. 15 illustrates a waveform group resulting from the normalization of a pressure waveform group defined by the hyperbolic function. The pressure waveform group, the normalized pressure waveform group, a first derivative waveform group, a second derivative waveform group, a third derivative waveform group, and a fourth derivative waveform group are shown in order from the top. Slopes are found from inflection points extracted from the derivative waveform groups, and from rates of change of the slopes, a C value indicating an extreme change of the pressure waveform characteristics is specified in the normalized pressure waveform group. FIG. 16 is a bar-graph representation of the slopes corresponding to the respective C values. From these charts, C=5 was the boundary value in this case. This is based on the verification result that strong nonlinearity indicates a healthy condition, and in this embodiment, the C value of a healthy adult was 5 or more.

Figure 17:
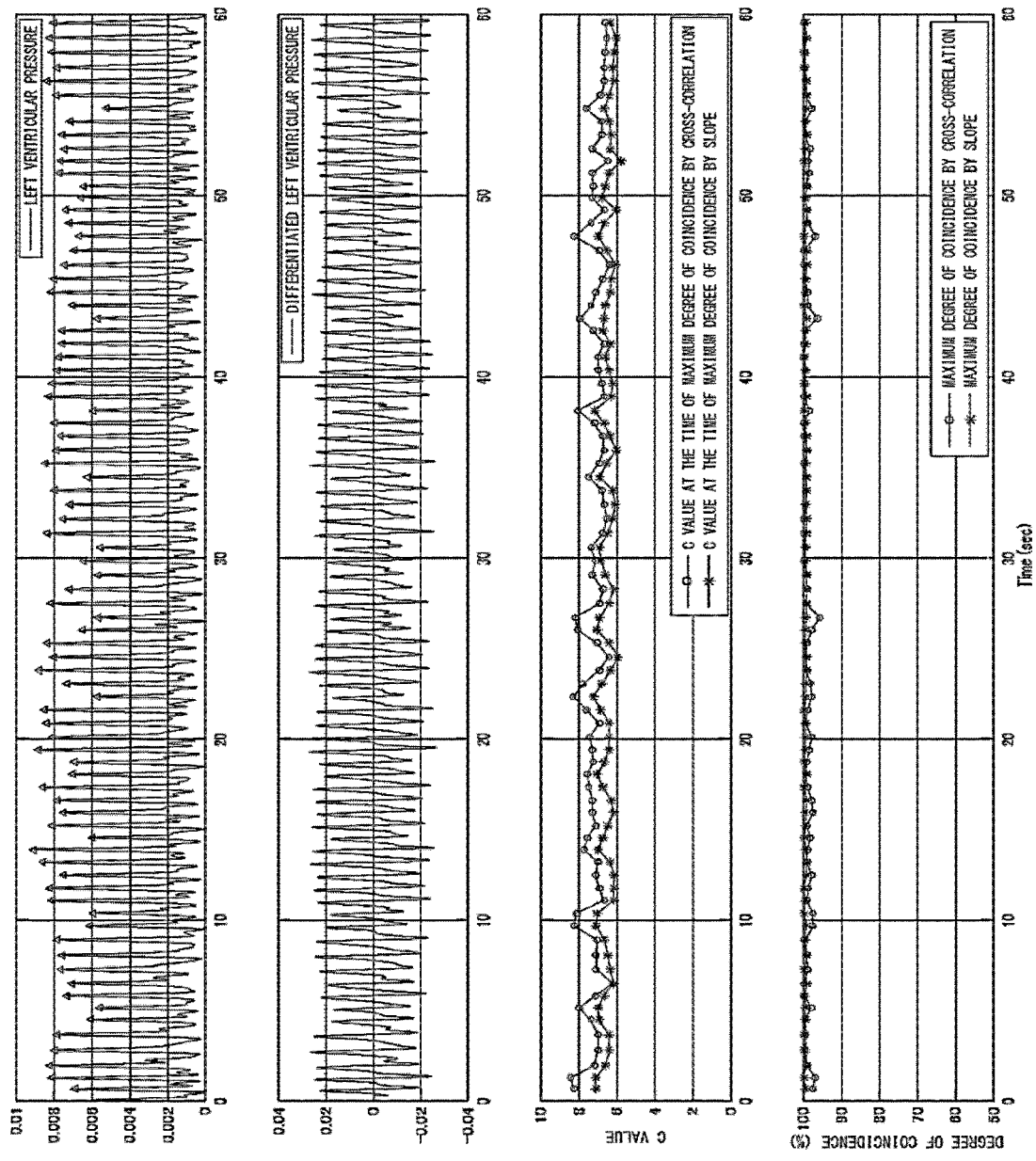
FIG. 17 is a chart illustrating an apical beat component waveform and a differentiated waveform from which a slope is found.

FIG. 17 illustrates an apical beat component waveform and a differentiated waveform from which a slope is found, and also illustrates C values derived from a cross-correlation function using the slopes of the first derivative waveform of the apical beat component waveform and the differentiated waveform. The determination of the C value derived using the differentiated waveform was highly accurate and facilitated the mechanical determination.

In FIG. 18(a), slopes of apical beat components found by the procedures in FIG. 7 to FIG. 10, which are to be experimental values, are found from the slopes of the particular solutions in FIG. 14, and the slopes are confirmed according to the analysis procedure in FIG. 17. This is a chart in which average values of the actually measured C values are plotted on the vertical axis with reference to the analysis values, and heart rates at the measurement time are plotted on the horizontal axis. In FIG. 18(a), the C value is taken on the vertical axis and the heart rate is taken on the horizontal axis because the time required for blood filling is correlated with heart rate. As a result of second-order polynomial approximation, a coefficient 2 of determination of patients with a lifestyle-related disease was 0.8536, that of patients with a cardiac disease/circulatory disease was 0.5948, and that of healthy people was 0.3751. On the whole, $R^2=0.2801$, from which it is seen that capturing the C value for each physical condition is a good way. A singular point of the heart rate was 80 to 90/min.

Figure 18:
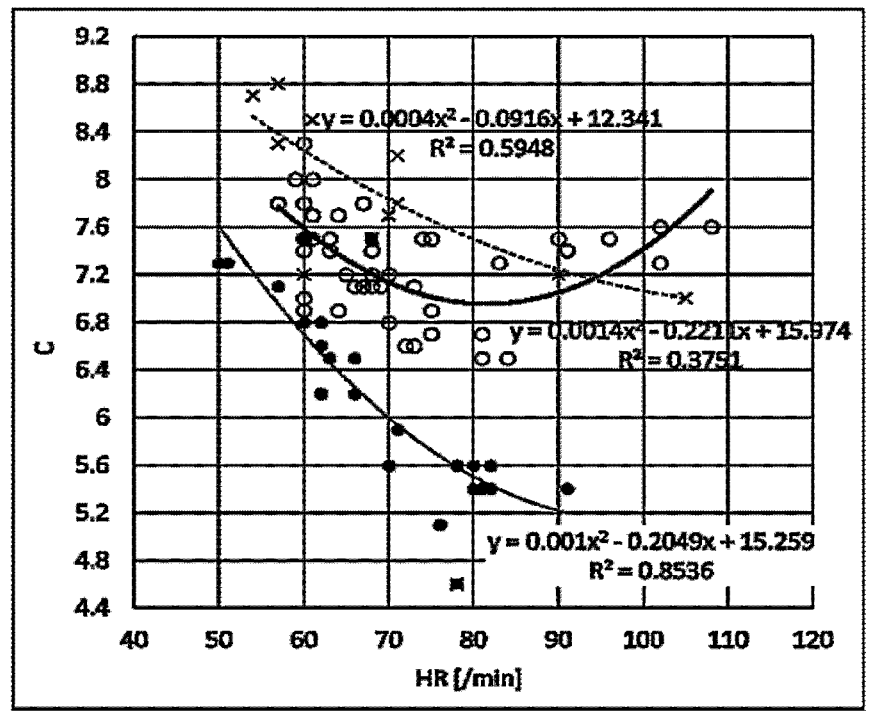
FIG. 18(a) is a chart illustrating a correlation between C value and heart rate at the measurement time.
FIG. 18(b) is a chart illustrating a correlation between the frequency of an apical beat vibration component and heart rate at the measurement time, which is on the horizontal axis.
Figure 18:
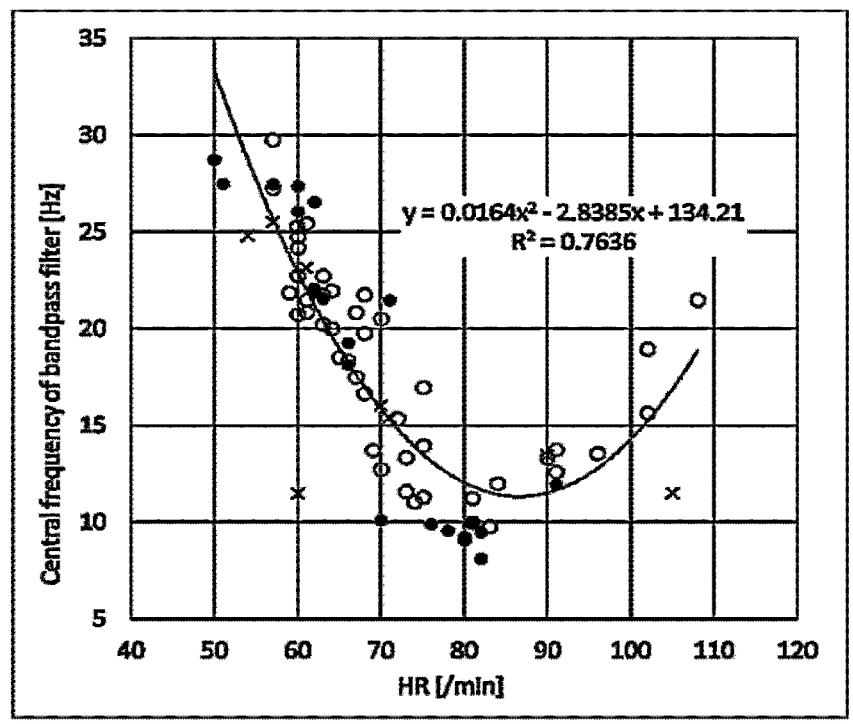

FIG. 18($b$) is a chart in which the frequency of apical beat vibration components coinciding with a ventricular systolic phase, found from APW according to the study procedure in FIG. 3 to FIG. 10 is taken on the vertical axis and the heart rate at the measurement time is taken on the horizontal axis. In this chart, as a result of second-order polynomial approximation, the coefficient $R^2$ of determination was 0.7636. Here as well, the singular point of the heart rate was 80 to 90/min. FIG. 18($b$) is intended to identify a frequency band of apical beat from the heart rate when subject's data in which a heart sound component and an apical beat component are mixed is analyzed. Note that the classification of NORMAL, LIFE-STYLE-RELATED DISEASE, and PATIENT WITH CARDIAC DISEASE/CIRCULATORY DISEASE is based on self-declaration.

Figure 19:
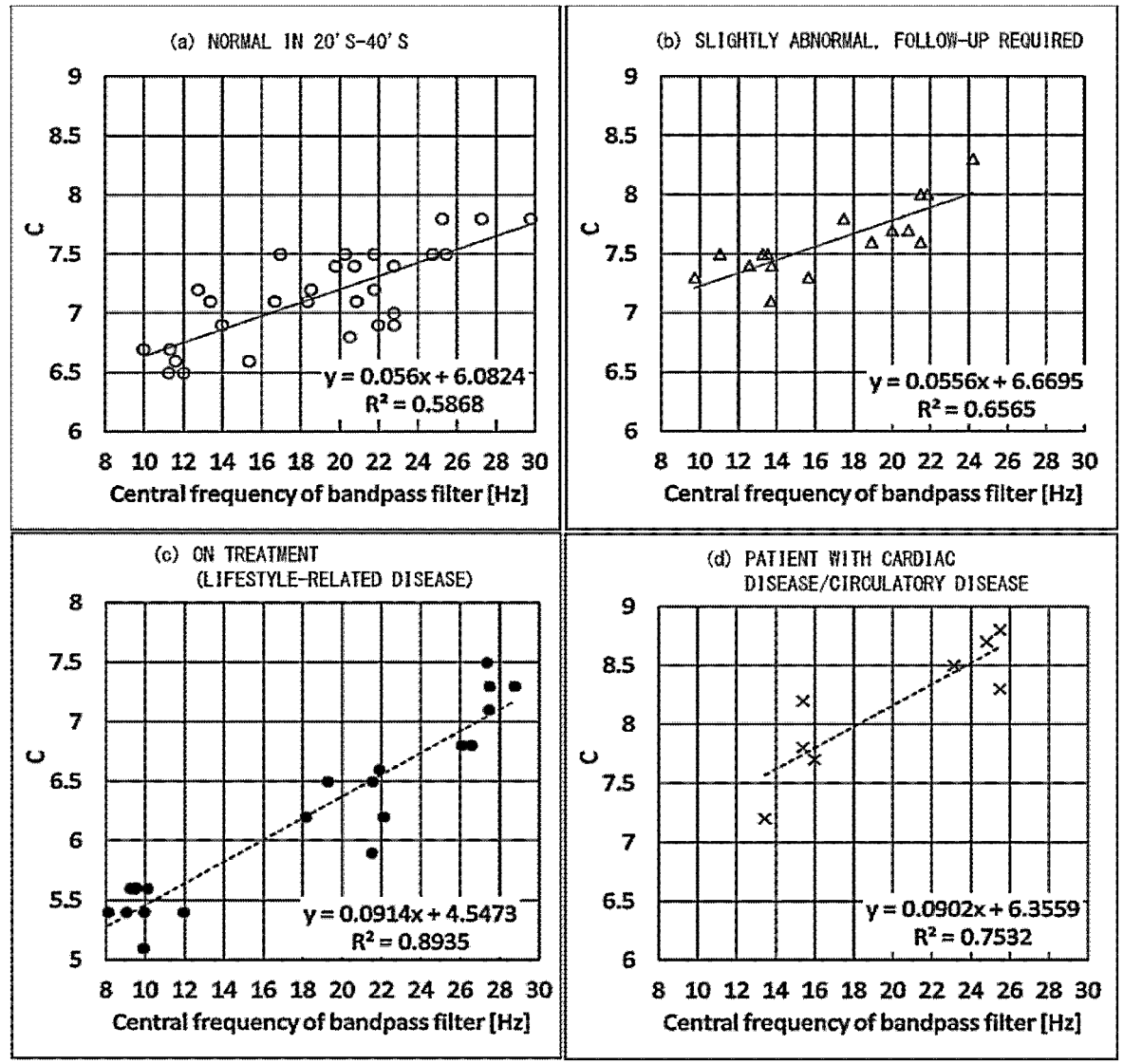
FIG. 19 is a chart illustrating a correlation between C value and an apical beat component frequency, regarding NORMAL PEOPLE, SLIGHTLY ABNORMAL/FOLLOW-UP REQUIRED, LIFESTYLE-RELATED DISEASE, and PATIENTS WITH CARDIAC DISEASE/CIRCULATORY DISEASE.
Figure 20:
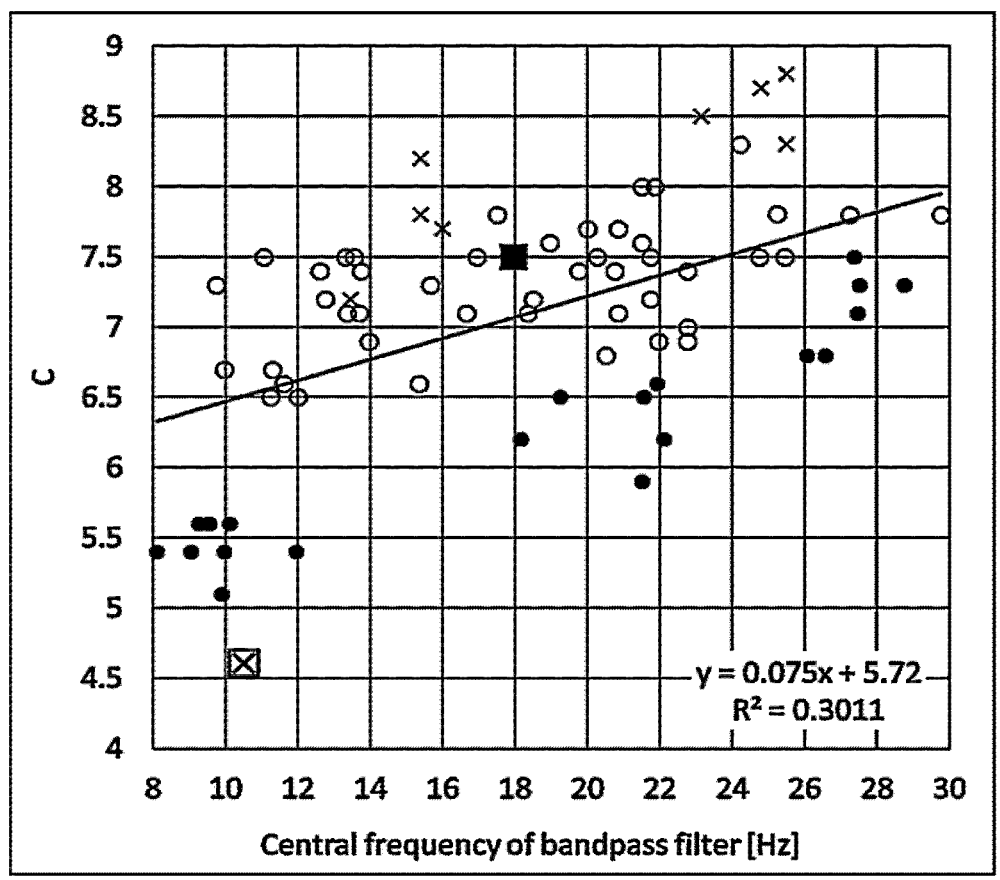
FIG. 20 is a chart illustrating the summary of the data in FIG. 19.
Figure 21:
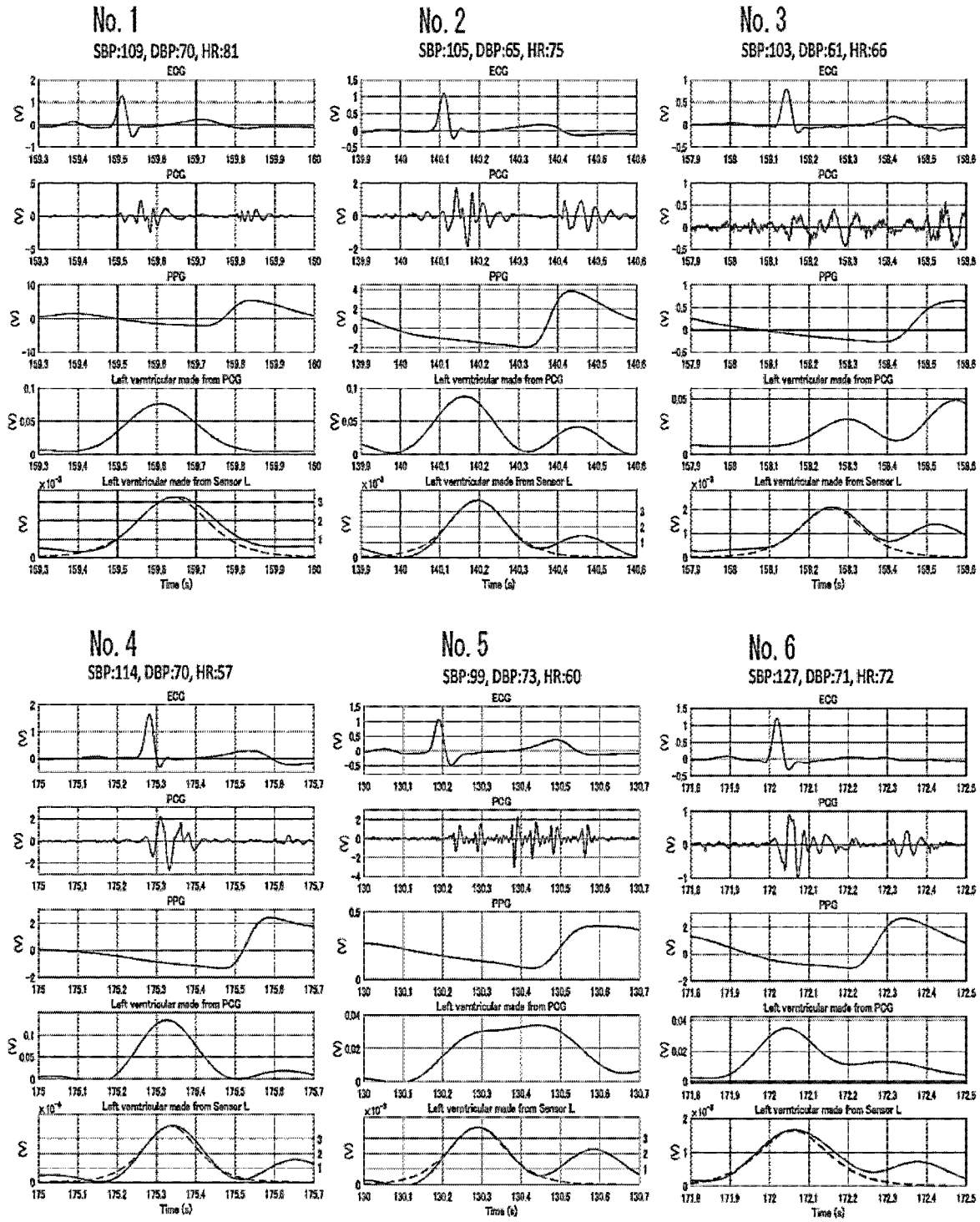
FIG. 21 is a chart illustrating cases where apical beat components are extracted from sensor waveforms of the biosignal measuring device (4SR) according to the embodiment, regarding healthy people in their twenties to forties (subjects No. 1-6).
Figure 22:
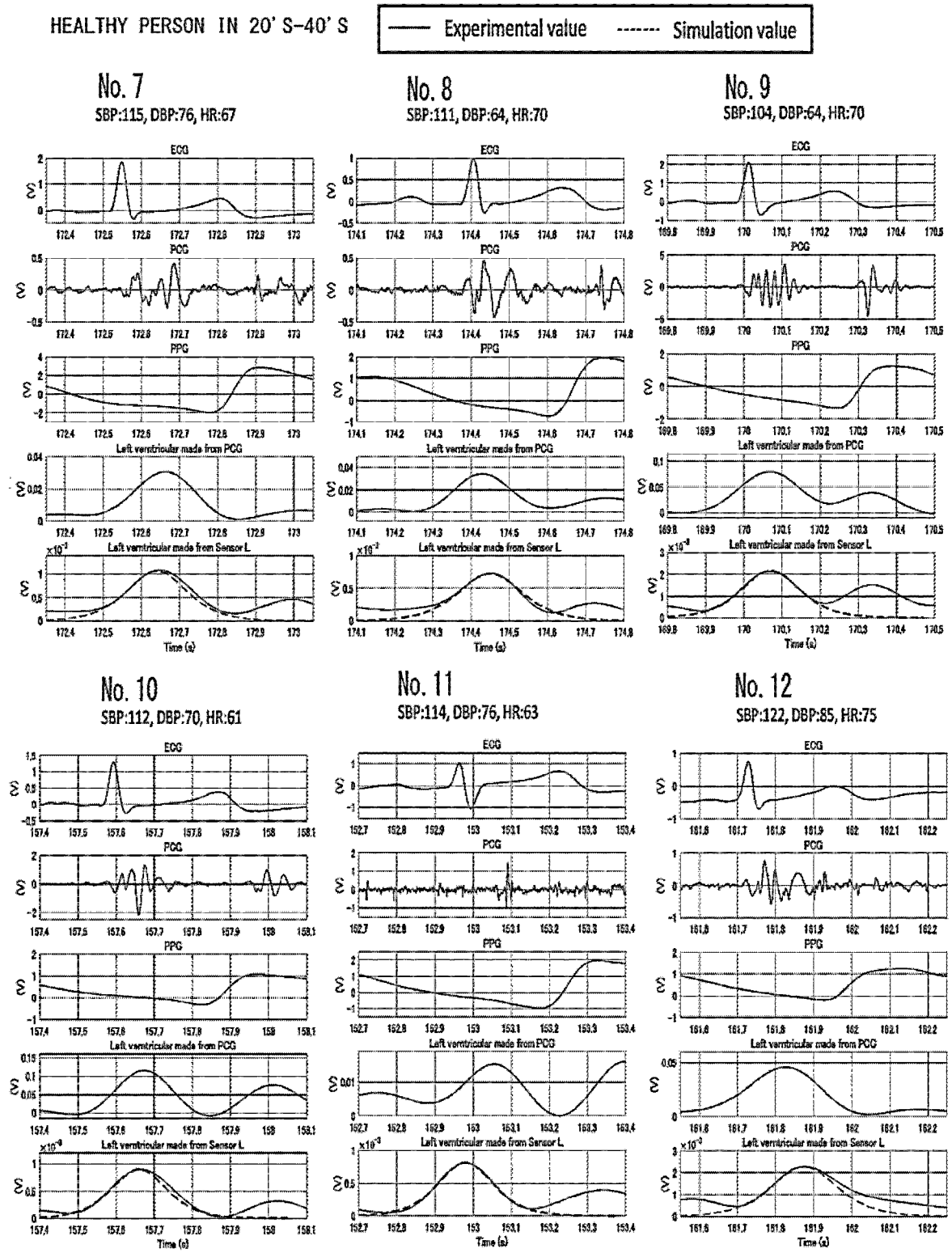
FIG. 22 is a chart illustrating cases where apical beat components are extracted from sensor waveforms of the biosignal measuring device (4SR) according to the embodiment, regarding healthy people in their twenties to forties (subjects No. 7-12).
Figure 23:
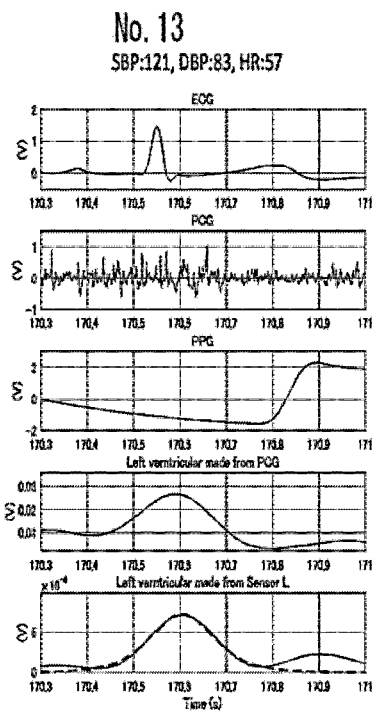
FIG. 23 is a chart illustrating cases where apical beat components are extracted from sensor waveforms of the biosignal measuring device (4SR) according to the embodiment, regarding healthy people in their twenties to forties (subjects No. 13-18).
Figure 23:
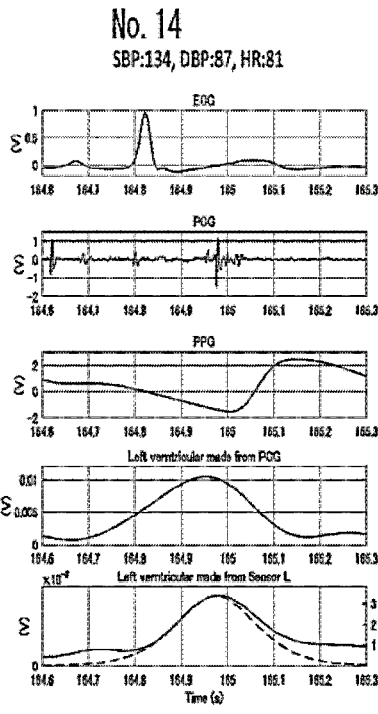
Figure 23:
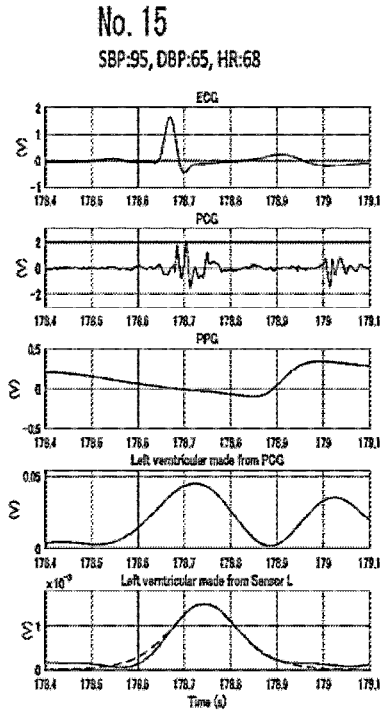
Figure 23:
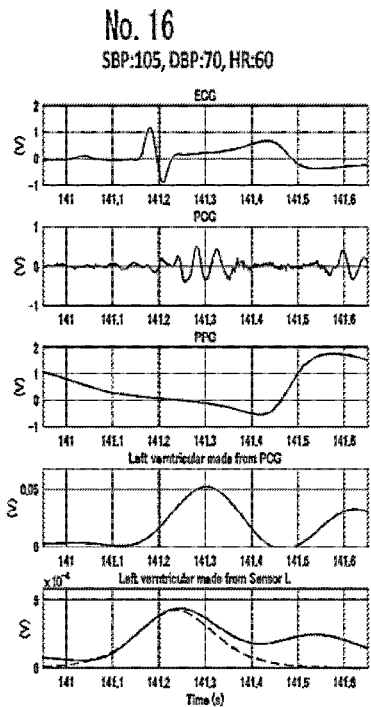
Figure 23:
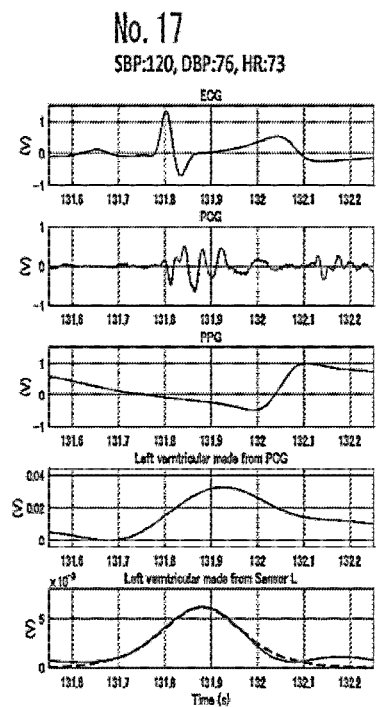
Figure 23:
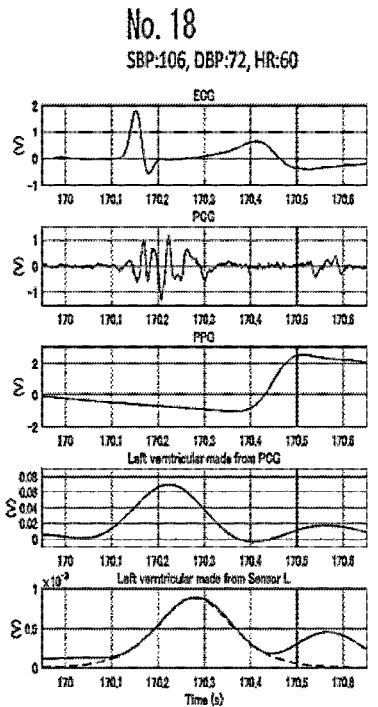
Figure 24:
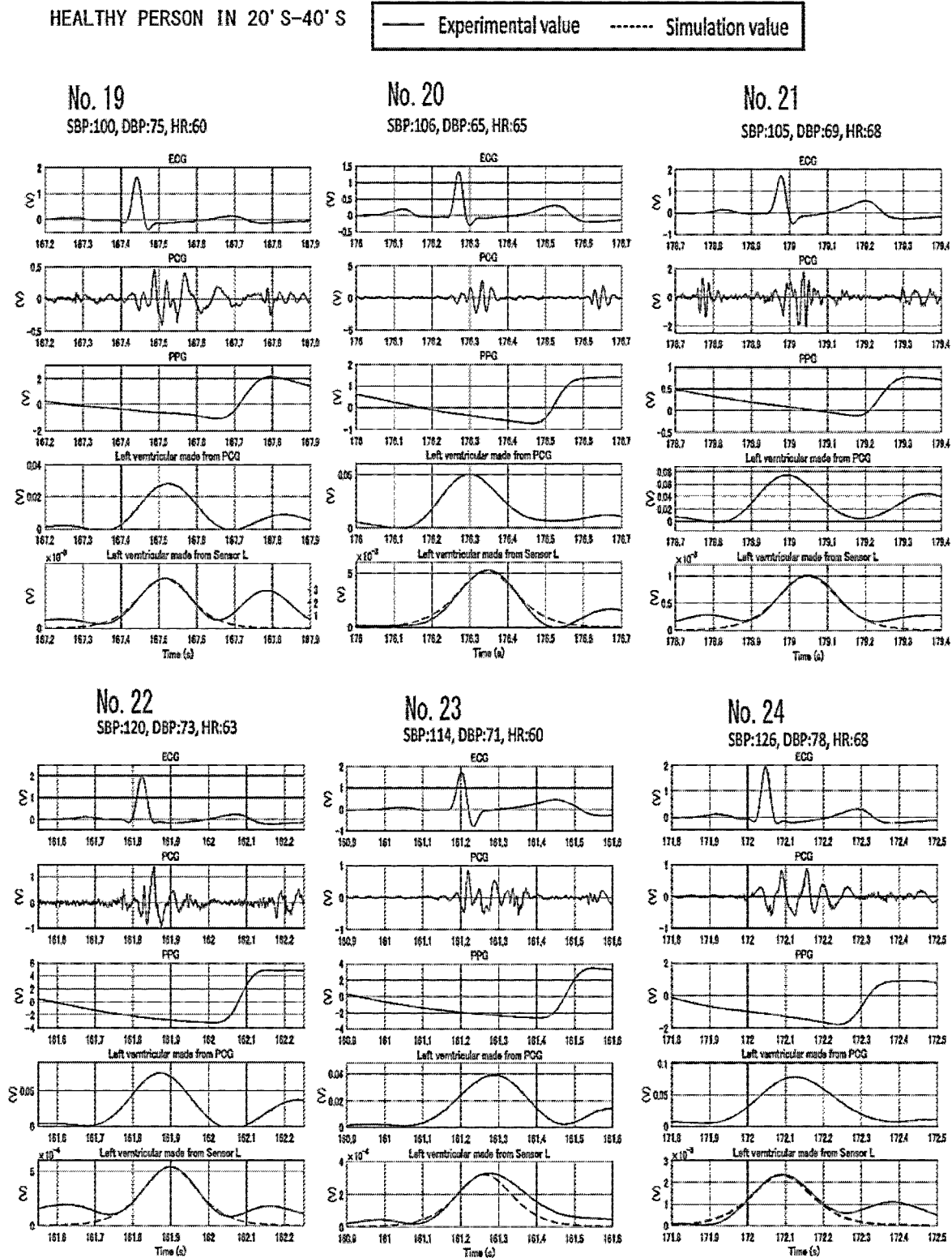
FIG. 24 is a chart illustrating cases where apical beat components are extracted from sensor waveforms of the biosignal measuring device (4SR) according to the embodiment, regarding healthy people in their twenties to forties (subjects No. 19-24).
Figure 25:
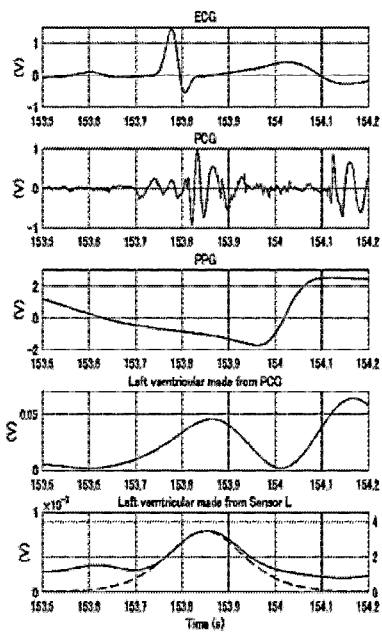
FIG. 25 is a chart illustrating cases where apical beat components are extracted from sensor waveforms of the biosignal measuring device (4SR) according to the embodiment, regarding healthy people in their twenties to forties (subjects No. 25-29).
Figure 25:
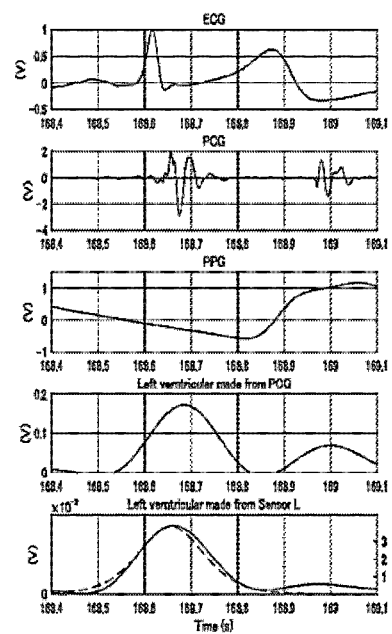
Figure 25:
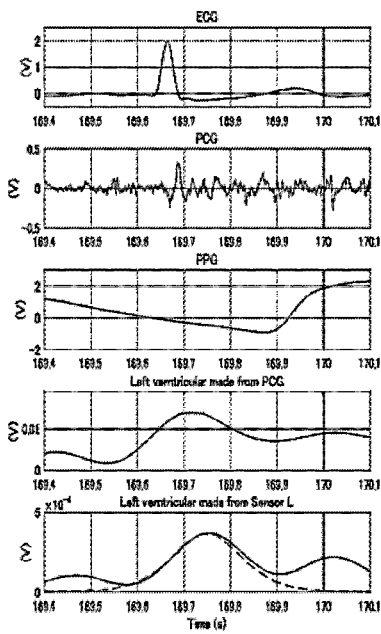
Figure 25:
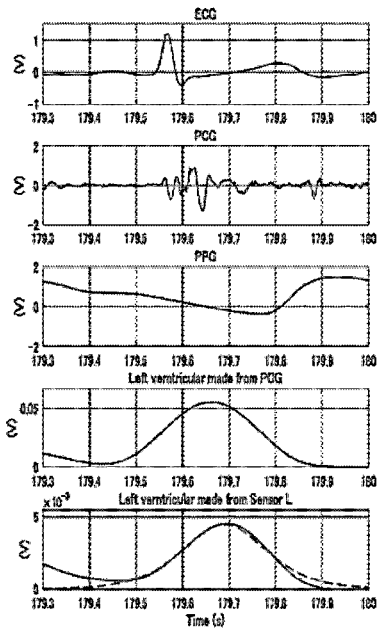
Figure 25:
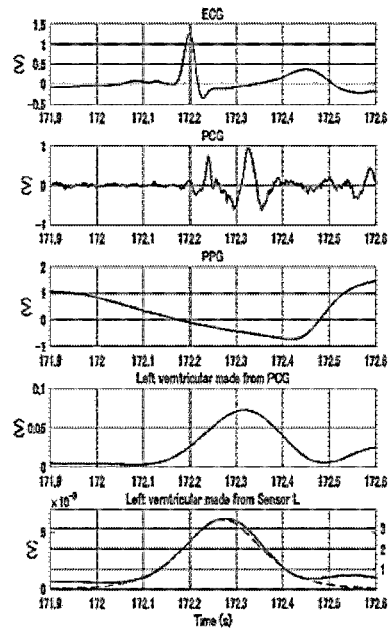

By drawing a chart of the C value and the frequency component, with the heart rate erased based on the combination of FIGS. 18($a$), ($b$) as in FIG. 19 and FIG. 20, it may be possible to classify LIFESTYLE-RELATED DISEASE and the others. FIG. 19 separately illustrates data of NORMAL, SLIGHTLY ABNORMAL/FOLLOW-UP REQUIRED, LIFESTYLE-RELATED DISEASE, and PATIENT WITH CARDIAC DISEASE/CIRCULATORY DISEASE, and FIG. 20 is the summary of these. Note that, in FIG. 20, the data of NORMAL and SLIGHTLY ABNORMAL/FOLLOW-UP REQUIRED are put together into data of HEALTHY PERSON IN 20'S-70'S. Further, in FIG. 20, data of a subject three months before death and one month before death are also shown. In the data obtained three months before death, the C value is about 7.5 which is a value classified as NORMAL, while in the data obtained one month before death, the C value is a very low value of about 4.5, from which it can be determined that his/her physical condition suddenly changed.

In FIG. 19 and FIG. 20, the behavior of the heart such as the left ventricular pressure waveform (C value) is taken on the vertical axis and the frequency component of vibration propagated to the thoracic wall is taken on the horizontal axis. The C value and the frequency component of the vibration are due to apical beat. The frequency of the collision vibration on the horizontal axis is considered as a physical indicator of extension force of the cardiac muscles in a ventricular output period. In the case of a resting subject with a 67/min heart rate, supposing that a half to one wave of APW is generated during 0.05 seconds of isovolumetric systole, the frequency of APW stemming from the isovolumetric systole is 10 to 20 Hz. If this wave continues in the same manner in 0.3 seconds of the ventricular output period, 3 waves to 6 waves are generated as APW stemming from the ventricular output period. Next, considering an individual difference, if a half to 1 wave is generated as APW during 0.035 seconds of the isovolumetric systole, the frequency of APW stemming from the ventricular contraction is 14.5 to 29 Hz. In 0.175 seconds of the ventricular output period, the frequency of APW is 17.25 to 34.5 Hz. Therefore, the apical beat component stemming from the ventricular contraction is present in APW of 10 to 34.5 Hz.

The pressure waveform as a basis of the behavior of the heart taken on the vertical axis is considered as one of the factors determining a stroke volume experimentally found from APW Subsequently to atrial contraction, ventricular contraction starts. FIG. 11 and FIG. 12 illustrate a state in which ventricular pressure is increased by ventricular contraction and at an instant when it becomes higher than atrial pressure, the atrioventricular valve closes, and in the ventricle which has become a tightly closed space, tension due to the contraction of the cardiac muscles presses blood present in the ventricle to suddenly increase the internal pressure. At an instant when the left ventricular pressure becomes higher than arterial pressure, the aortic valve is pushed open and the output of blood starts. Since a blood output rate from the left ventricle is higher than a rate at which the blood flows away to peripheral blood vessels, most of the output blood expands the elastic blood vessel. To expand the elastic blood vessel, the blood temporarily stays at the left coronary artery inlet. Consequently, the arterial pressure increases to become systolic blood pressure. FIG. 11 illustrates a hypothetical process in which the pressure wave is generated during a cardiac cycle. It is assumed that the baseline of the pressure fluctuation is a pressure value that a residual amount of the blood in the left ventricle, that is, an end-systolic volume has. The end-systolic volume is ⅓, and it is assumed that triphasic to quadraphasic pressure waves that are positive/negative/positive to negative cause the generation of a positive pressure wave in a steep hyperbolic shape on a baseline that is a line of the internal pressure that the aforesaid ⅓ volume has, at the time of the ventricular contraction, immediately before the aortic valve opens.

An envelope curve of monophasic to hexaphasic or octaphasic waves formed by APW is considered as approximating volume fluctuation in a period from the closing of the mitral valve up to the opening of the mitral valve, and it is assumed that the envelope curve contains information corresponding to the pressure-volume loop. Therefore, supposing that a half wave is generated during 0.3 seconds of the ventricular output period, the frequency is 1.7 Hz, and supposing that a half wave is generated during 0.175 seconds of the ventricular output period, the frequency is 2.9 Hz, and supposing that a half wave is generated during 0.1 seconds of the ventricular output period, the frequency is 5 Hz. This is a ground for a 5 Hz low pass filter, illustrated in FIG. 7, for creating the envelope curve. The analysis procedure for extracting the biosignal stemming from the ventricular contraction will be discussed. As previously described, the frequency to be analyzed of APW stemming from the ventricular contraction is 10 to 34.5 Hz, and the low pass filter is the 5 Hz filter. Waveforms are captured by the microphone sensor L and biosignals stemming from the ventricular contraction are considered as being between the isovolumetric systole and the isovolumetric diastole. Healthy people in their twenties to forties have individual differences and itis assumed that the relevant waves are in a range between 10 and 34.5 Hz. All the fundamental frequencies within the analysis target range were analyzed, waveforms were extracted, and waveforms present in a phase starting from the first sound in phonocardiograms and QRS waves in electrocardiograms and ending at the second sound of the phonocardiograms were sought out. FIG. 21 to FIG. 25 are data of healthy people in their twenties to forties (subjects No. 1-29) which data correspond to FIG. 9 found according to the procedures in FIG. 7 and FIG. 8. The simulation values in the charts are obtained according to the analysis procedures of FIG. 14 and FIG. 17. Further, the graphs of the subjects No. 1-29 illustrated in FIG. 21 to FIG. 25 are time-series data of ECG (electrocardiograms), time-series data of PCG (phonocardiograms), time-series data of PPG (finger plethysmograms), time-series data of the left ventricular pressures found from the phonocardiograms, and time-series data of the left ventricular pressures found from the biosignal detection unit 11 (microphone sensor L) in order from the top.

It is seen that APWs measured from 4SR are each different in phase, cardiac murmur, and rising slope from the waveform of heart sound captured from the anterior thorax, and the aforesaid rising phase of the pressure wave and the timing of the first sound disappearance fall within the ⅔ phase of the pressure wave. This indicates that APW measured from the posterior thorax is information different from the heart sound.

It is assumed that this pressure wave follows the general solution of Equation (1). Therefore, it is assumed that the rising of the pressure wave generated in the aorta also follows the general solution of Equation (1). ¾ of the output amount is output during a 0.05+0.15=0.2 second period, which is the first half of systole, and the remaining ¼ is output in the latter half of the systole. Then, it follows that peaks of the pressure wave following the solution of Equation (a) are present in a phase that starts from the first heart sound and is slightly longer than about a half of the ventricular systole. Further, since the aortic valve opens at an instant when the left ventricular pressure becomes higher than the aortic pressure, a half-power point of the waveform induced from the solution of Equation (1) is considered as the starting point. Further, at the half-power point, the aortic valve opens and thus the first heart sound disappears. From these, the aortic pressure wave rises from a pressure value 0.707 times the amplitude of the wave. Therefore, assuming that systolic blood pressure is 120 mmHg, diastolic blood pressure is 120×0.707=84.8 mmHg. In the latter half of the systole, the blood output rate lowers and the rate at which the blood flows away to the peripheral blood vessels becomes higher, so that the blood pressure begins to decrease. Then, an instantaneous backflow closes the aortic valve. The closure of the aortic valve is accompanied by the mixture of the positive pressure wave into the apical beat wave. At this time, ⅔ of the blood in the left ventricle in the end-diastole has been output. From a viewpoint of the output amount, it can also be said that a pressure about ⅔ of the pressure amplitude created by fluctuation of the left ventricular pressure is the baseline of the aortic pressure wave. That is, these are hypotheses that, in the case where systolic blood pressure is 120 mmHg, diastolic blood pressure is 120×⅔=80 mmHg, and the baseline of the aortic pressure wave, that is, the diastolic blood pressure are present in a range of about 80 to 85 mmHg, and the timing at which the first heart sound disappears is a ⅔ point of the pressure wave. These hypotheses will be studied based on experimental values.

Figure 26:
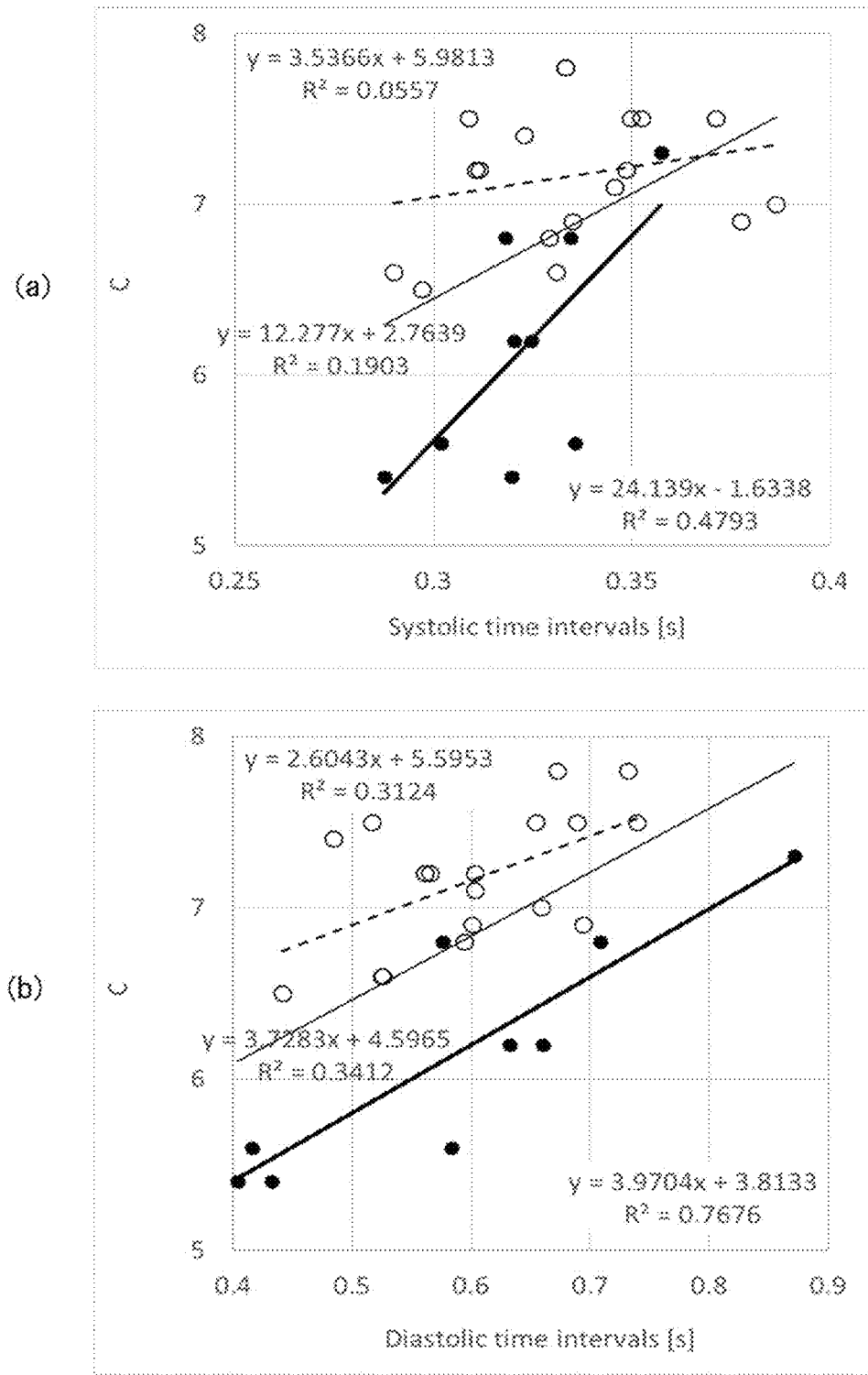
FIG. 26(a) is a chart illustrating systolic time intervals on the horizontal axis and C values of pressure waveforms on the vertical axis.
FIG. 26(b) is a chart illustrating diastolic time intervals on the horizontal axis and C values of pressure waveforms on the vertical axis.

In the normal heart of a healthy person in his/her twenties to forties, as a diastolic ventricular volume is larger, a larger number of myocardial fibers receive extension stimulation, and contractile force thereafter is larger. Therefore, an increase in ventricular preload increases the output amount from the ventricle. FIGS. 26(*a*), (*b*) illustrate diastolic time interval on the horizontal axis and the C value of the pressure waveform on the vertical axis. The diastolic time interval and the C value exhibited a positive correlation in the regression line for each physical condition, which matched the present description.

Figure 27:
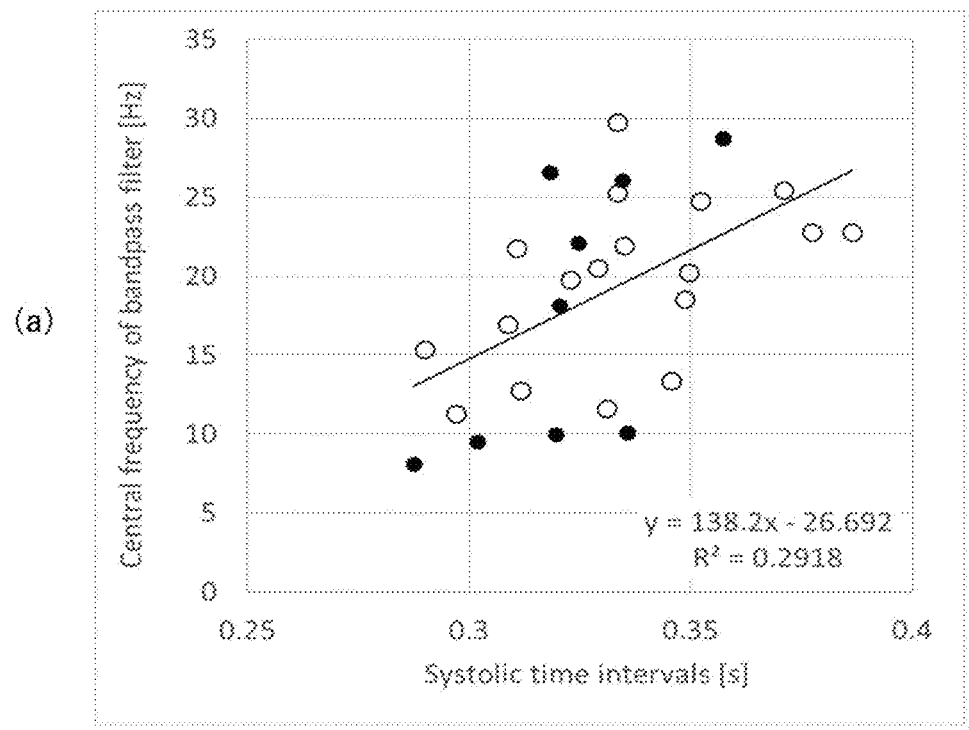
FIG. 27(a) is a chart illustrating a correlation between apical beat component frequency and systolic time interval.
FIG. 27(b) is a chart illustrating a correlation between apical beat component frequency and diastolic time interval.
Figure 27:
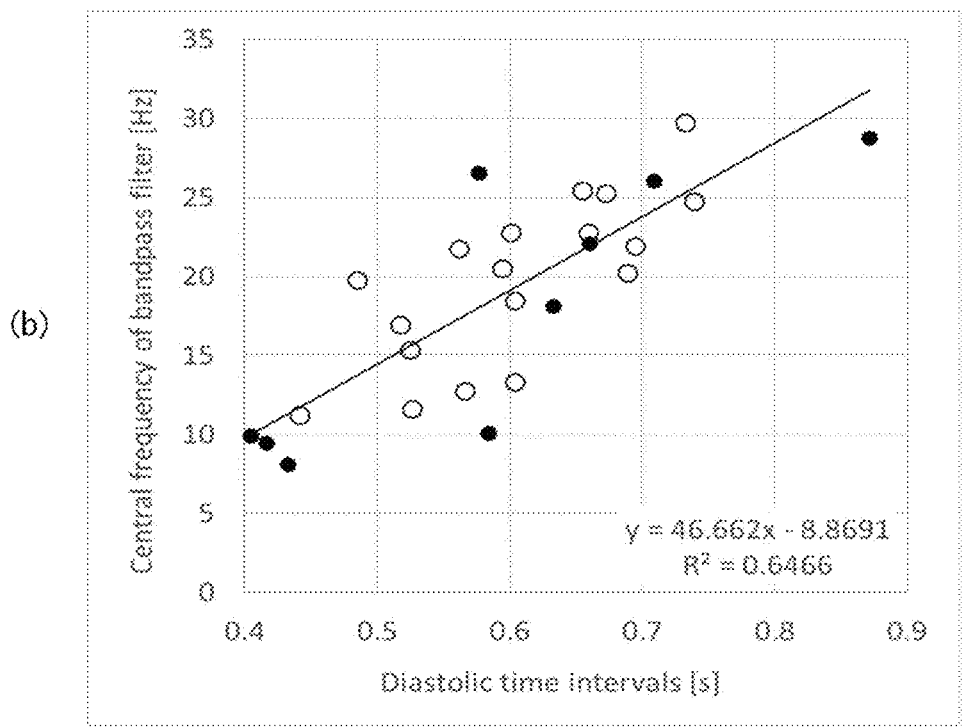

Along diastolic time results in a high vibration frequency of an apical beat component, and contrarily, a short diastolic time results in a low frequency of the apical beat component. Therefore, in the normal heart, the frequency of the apical beat component and preload are highly correlated. FIG. 27 are charts illustrating correlations between the frequency of the apical beat component and systolic and diastolic time intervals. It is seen that the coefficient of determination in the diastole is higher than in the systole. This does not depend on preload to the myocardial fibers not having been contracted, but when the myocardial cells contract, certain resistance called afterload determined by systolic ventricular pressure (arterial pressure) is applied. Systolic performance is independent of preload and afterload, and receiving the influence of chemical stimulation or hormone at the time of the contraction is a ground for the difference in the coefficient of determination.

Figure 28:
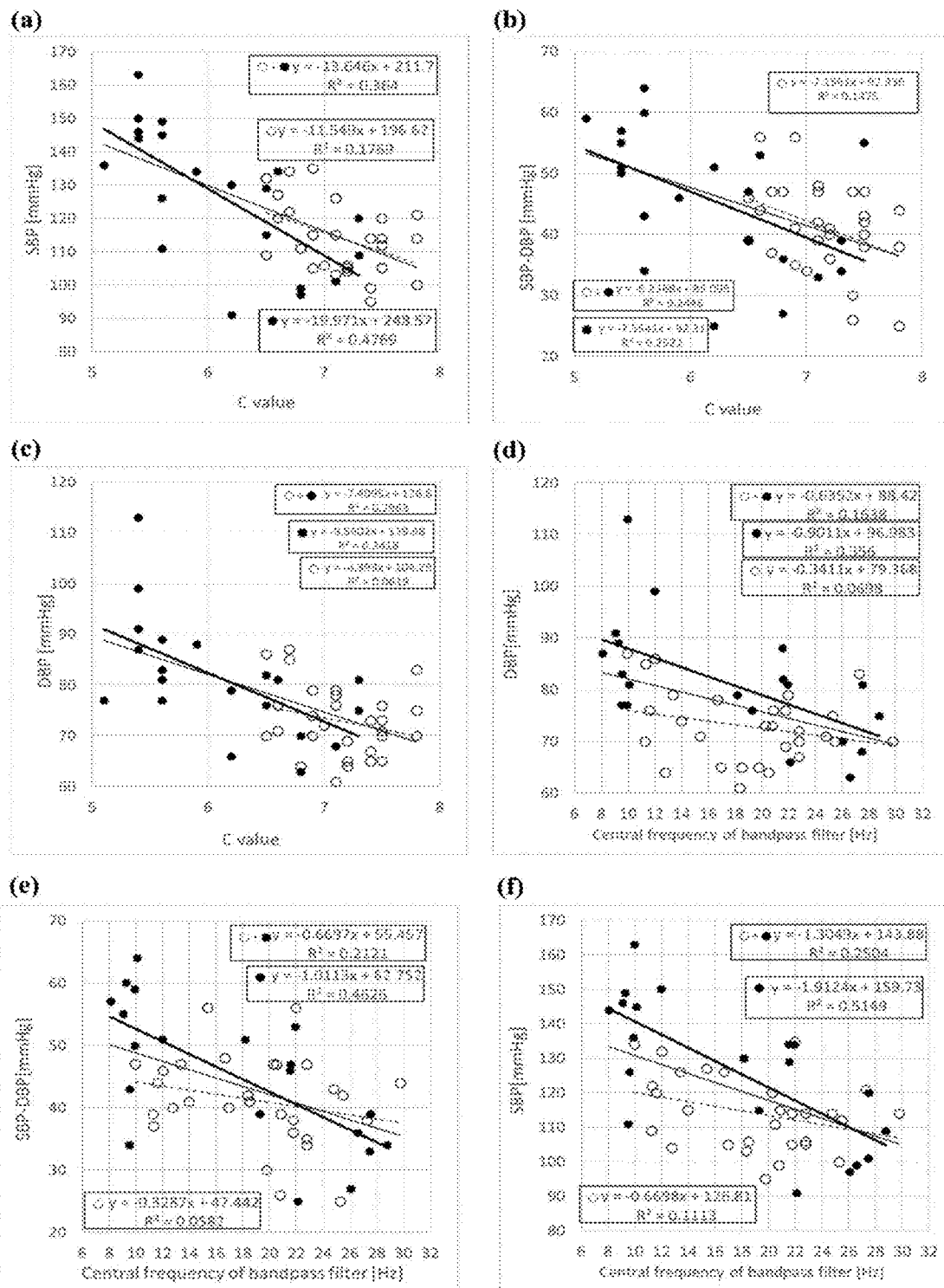
FIG. 28(a) is a chart illustrating a correlation between systolic blood pressure and C value.
FIG. 28(b) is a chart illustrating a correlation between pulse pressure and C value.
FIG. 28(c) is a chart illustrating a correlation between diastolic blood pressure and C value.
FIG. 28(d) is a chart illustrating a correlation between diastolic blood pressure and apical beat frequency.
FIG. 28(e) is a chart illustrating a correlation between pulse pressure and apical beat frequency.
FIG. 28(f) is a chart illustrating a correlation between systolic blood pressure and apical beat frequency.
Figure 29:
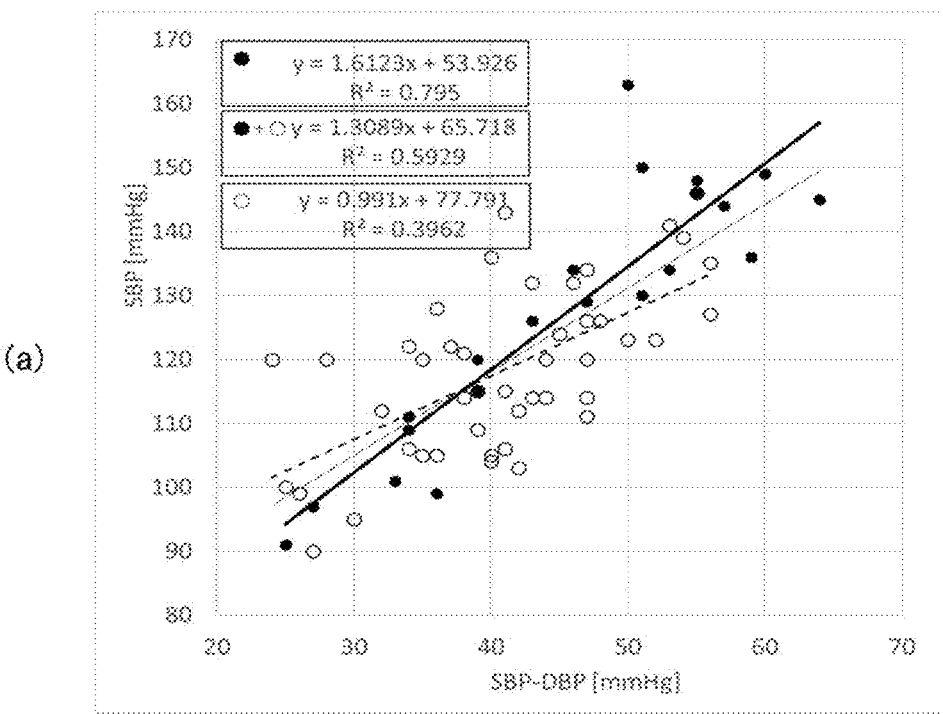
FIG. 29(a) is a chart illustrating a correlation between pulse pressure and systolic blood pressure.
FIG. 29(b) is a chart illustrating a correlation between diastolic blood pressure and systolic blood pressure.
Figure 29:
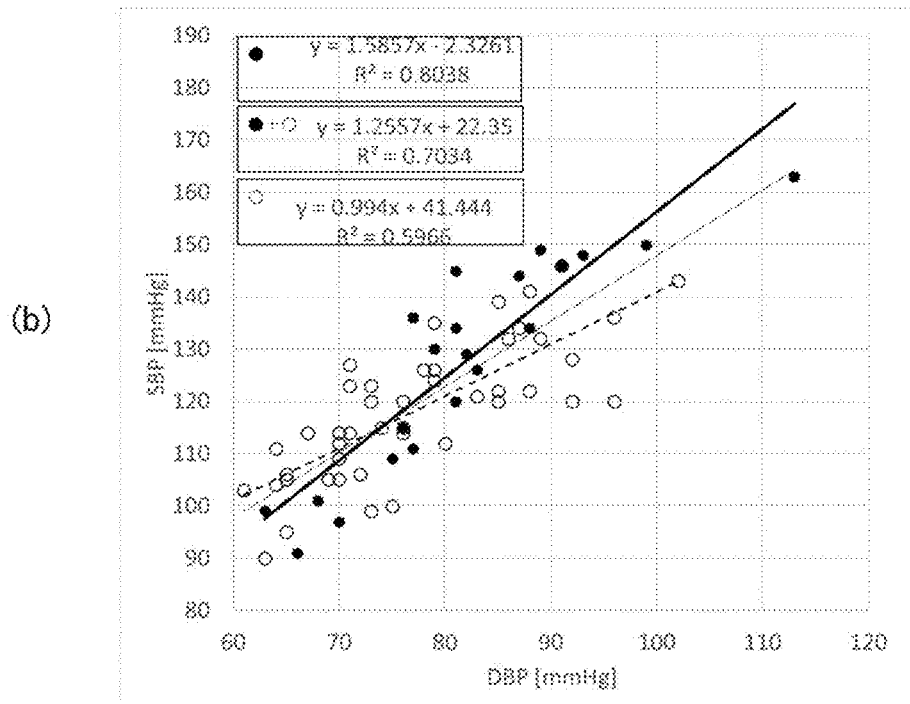

FIG. 28 are the results of studies on correlations between blood pressure and C value and between blood pressure and apical beat frequency. The C value of a subject influenced by afterload reduces. Arterial pressure or pulse pressure becomes afterload, and when the pulse pressure is high, the C value lowers. FIG. 29(*a*) illustrates the results of studies on a correlation between pulse pressure and systolic blood pressure, and FIG. 29(*b*) illustrates the results of studies on a correlation between diastolic blood pressure and systolic blood pressure. Both presented a positive correlation. As compared with the normal heart, in a subject with a lifestyle-related disease having high afterload, an intercept value is high and a slope is large. Then, since this subject is strongly influenced by a factor determining the cardiac output, the coefficient $R^2$ of determination is high. The coefficient $R^2$ of determination of a patient with a cardiac disease/circulatory disease undergoing systolic performance control by drug administration is still higher. Further, because he/she is also undergoing afterload control, his/her C value increases contrary to that of the subject with a lifestyle-related disease. The slope of the regression line has the same tendency as that of the patient with a lifestyle-related disease.

Therefore, it is inferred that, if the vibration frequency of the apical beat component which depends on the arterial pressure is high, there is a possibility that contractile force is large and the C value increases.

Here, in FIG. 19 and FIG. 20, the vertical axis is an input and the horizontal axis is an output from a viewpoint of the cardiac cycle. The notations of the classification in the charts are based on the criteria category of Japan Society of Ningen Dock, revised on Apr. 1, 2018, partly changed and updated on Dec. 14, 2018. NORMAL IN 20'S-40'S corresponds to the criteria category A: Normal, SLIGHTLY ABNORMAL/FOLLOW-UP REQUIRED corresponds to the criteria category B: Slightly abnormal/C: Follow-up required, and ON TREATMENT (LIFESTYLE-RELATED DISEASE) corresponds to the criteria category D: Medical care needed/E: On treatment. A patient with a cardiac disease/circulatory disease is a patient who is basically in a lying and resting state in daily life and undergoes doctor's treatment/is certified for long-term care level 3. A person who can live his/her daily life even though having a cardiac disease is classified into ON TREATMENT (LIFESTYLE RELATED DISEASE) category. The C value of the healthy people in their twenties to forties was a median value, and the C value of the subjects with a lifestyle-related disease was low, and the C value increased in order of SLIGHTLY ABNORMAL/FOLLOW-UP REQUIRED and PATIENT WITH CARDIAC DISEASE/CIRCULATORY DISEASE.

According to this embodiment, it was possible to extract the apical beat components using APW captured from the posterior thorax. From the apical beat components, the pressure waveform in the ventricular output period is formed, the pressure waveform in the ventricular output period is identified by the hyperbolic function, and the pressure/velocity-related C value of the measured pressure waveform, that is, the indicator relating to the left ventricular pressure waveform was found. It has been further found out that the C value of the apical beat component and the diastolic time interval have a correlation according to the physical condition, and the frequency of the apical beat component and the diastolic time interval are highly correlated regardless of the physical condition. It has been further found out that the C value, the frequency of the apical beat component, and blood pressure tend to have a high correlation with a patient with a lifestyle-related disease. These indicate the possibility that using the C value and the frequency of the apical beat component as parameters enables the classification based on the criteria category of Society of Japan Ningen Dock revised on Apr. 1, 2018, partly changed and updated on Dec. 14, 2018, and enables the determination of NORMAL, SLIGHTLY ABNORMAL/ FOLLOW-UP REQUIRED, LIFESTYLE-RELATED DISEASE, AND PATIENT WITH CARDIAC DISEASE/CIRCULATORY DISEASE.

Figure 30:
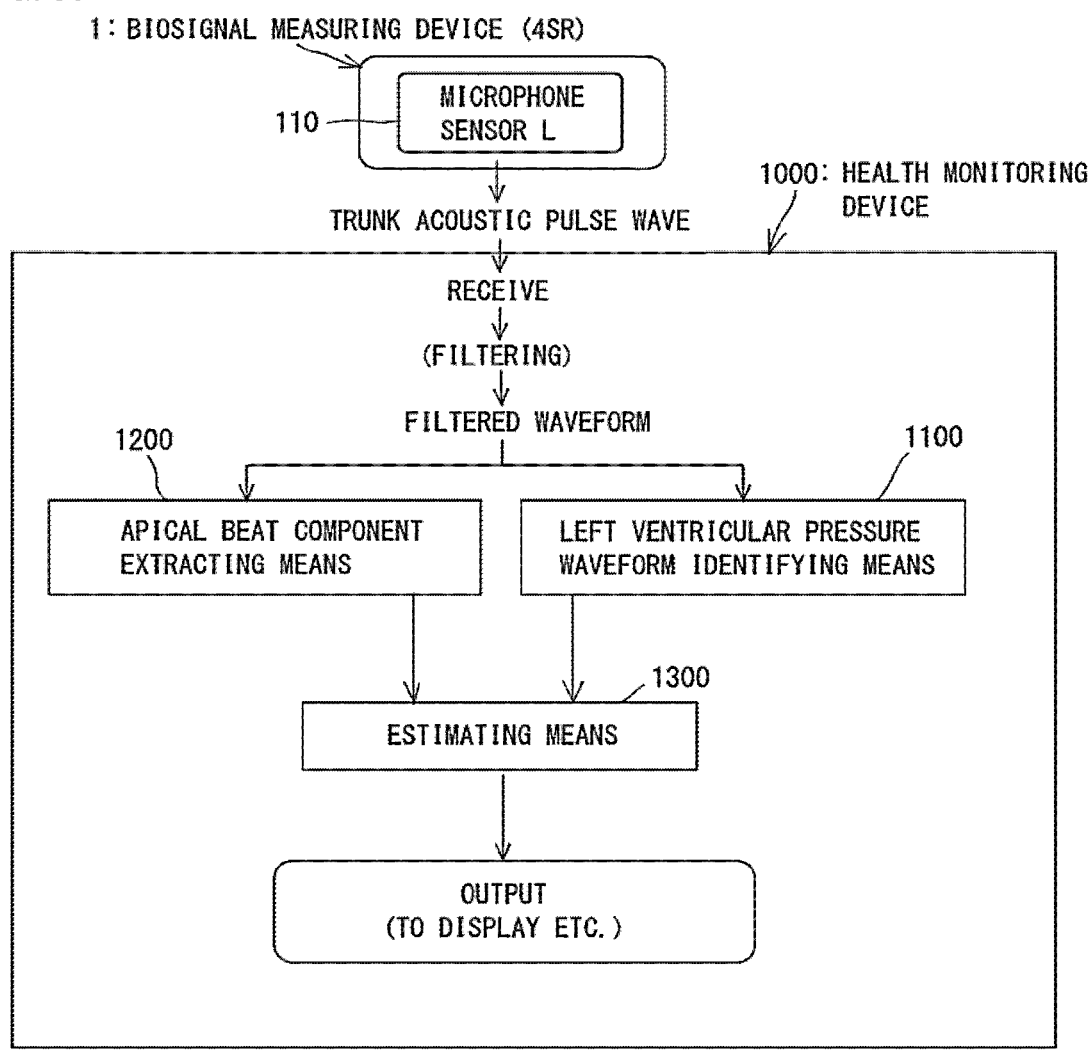
FIG. 30 is a block diagram illustrating the configuration of a health monitoring device according to the embodiment.

A health monitoring device illustrated in FIG. 30 is constituted in this embodiment based on the above description. Specifically, this is a health monitoring device 1000 which processes a trunk acoustic pulse wave measured from the trunk of a person to estimate the health condition of the person, the health monitoring device 1000 including: a left ventricular pressure waveform identifying means 1100 which finds an indicator relating to a left ventricular pressure waveform indicating the behavior of the heart, from the trunk acoustic pulse wave obtained from the biosignal measuring device 1 (4SR); an apical beat component extracting means 1200 which extracts, from the trunk acoustic pulse wave, a frequency component stemming from an apical beat; and an estimating means 1300 which estimates the health condition of the person from a correlation between the indicator relating to the left ventricular pressure waveform and a vibration frequency of the frequency component stemming from the apical beat.

The left ventricular pressure waveform identifying means 1100 identifies a C value which indicates the left ventricular pressure waveform as described above. The C value is found as follows: the trunk acoustic pulse wave is filtered with a predetermined frequency band and components relating to heart sound components are excluded therefrom, remaining frequency components are found as apical beat components, a pressure waveform is formed from the apical beat components, an indicator relating to the slope of the pressure waveform is found using a hyperbolic function as described above, and the found indicator is the C value. Based on the C value found as in the above, different values are output according to the subject's health condition, such as whether the subject is healthy. In the case where a heart sound component and an apical beat component are mixed, the frequency of the apical beat component is decided using the correlation diagram illustrated in FIG. 18(b).

The frequency component stemming from the apical beat identified by the apical beat component extracting means 1200 is a frequency of apical beat which is feedback force when blood is sent out from the heart, and let the C value indicating the state of the aforesaid pressure wave be input information, then the frequency component is output information. Therefore, by taking these on the vertical axis and the horizontal axis, it is possible to create correlation diagrams corresponding to NORMAL, SLIGHTLY ABNORMAL/FOLLOW-UP REQUIRED, PATIENT WITH LIFESTYLE-RELATED DISEASE, and PATIENT WITH CARDIAC DISEASE/CIRCULATORY DISEASE.

The diagrams are stored as a database in the health monitoring device 1000 constituted by a computer, and the left ventricular pressure waveform identifying means 1100 and the apical beat component extracting means 1200 analyze the trunk acoustic pulse wave that the biosignal measuring device 1 has obtained from a subject who is a health monitoring target, and then the estimating means 1300 is capable of estimating the health condition of the subject who is the health monitoring target, by collating the analysis results with the database.

Since the C value and the diastolic time interval are highly correlated as illustrated in FIG. 26(b), the estimating means 1300 is also capable of inferring whether the subject is a healthy person or a patient with a lifestyle-related disease, by using the C value.

Further, since the C value is also correlated with blood pressure as illustrated in FIGS. 28(a) to (c), the estimating means 1300 is also capable of estimating blood pressure using the C value.

In the health monitoring device 1000, a computer program causing the execution of the procedures functioning as the aforesaid left ventricular pressure waveform identifying means 1100, apical beat component extracting means 1200, and estimating means 1300 is stored in a storage unit (including not only a recording medium such as a hard disk built in the computer (health monitoring device 1000) but also any of removable recording mediums, and a recording medium of another computer connected through communication means). Further, the computer program causes the computer to execute the procedures so that the computer functions as the left ventricular pressure waveform identifying means 1100, the apical beat component extracting means 1200, and the estimating means 1300. Further, they can be implemented by an electronic circuit having one storage circuit or more in which the computer program implementing the left ventricular pressure waveform identifying means 1100, the apical beat component extracting means 1200, and the estimating means 1300 is incorporated.

Further, the computer program can be provided by being stored in a recording medium. The recording medium storing the computer program may be non-transitory. The non-transitory recording medium is not limited and its examples include recording mediums such as a flexible disk, a hard disk, CD-ROM, MO (magneto-optical disk), DVD-ROM, and a memory card. It is also possible to transfer the computer program to the computer through communication lines to install it.

EXPLANATION OF REFERENCE SIGNS 1 biosignal measuring device (4SR)
110 base member
11 left upper part biosignal detection unit (sensor L)
12 right upper part biosignal detection unit (sensor R)
13 lower part biosignal detection unit (sensor M)
14, 15 film
100 three-dimensional knitted fabric
110 microphone sensor
1000 health monitoring device
1100 left ventricular pressure waveform identifying means
1200 apical beat component extracting means
1300 estimating means

The invention claimed is:
1. A health monitoring device which processes a trunk acoustic pulse wave measured from the trunk of a person to estimate a health condition of the person, the health monitoring device comprising:

circuitry configured to:
match a left ventricular pressure waveform resulting from filtering of the trunk acoustic pulse wave, with waveforms indicated according to a constant C, where a C value is a constant given by flow velocity and pressure, when x=0 and t=±0.35 seconds in a wave equation represented by the following equation:

$$u(t,x)=\phi(x-ct)+\phi(x-c(t+\alpha))=c/2\ \text{sech}^2(\sqrt{c}/2(x-ct)+c/2\ \text{sech}^2(\sqrt{c}/2(x-c(t+\alpha)))$$

and finds a C value of a corresponding one of the waveforms as an indicator relating to the left ventricular pressure waveform which indicates a behavior of the heart;
extract, from the trunk acoustic pulse wave, a frequency component stemming from an apical beat; and
estimate the health condition of the person from a correlation between the indicator relating to the left ventricular pressure waveform and a vibration frequency of the frequency component stemming from the apical beat.

2. The health monitoring device according to claim 1, wherein the circuitry is configured to estimate the health condition from a correlation between the indicator relating to the left ventricular pressure waveform and a diastolic time interval in a cardiac cycle, the diastolic time interval indicating a magnitude of the vibration frequency of the apical beat component.

3. The health monitoring device according to claim 1, wherein the circuitry is configured to estimate blood pressure using the indicator relating to the left ventricular pressure waveform.

4. The health monitoring device according to claim 1, wherein the trunk acoustic pulse wave is a signal captured by a biosignal measuring device disposed on a posterior thorax of the person.

5. The health monitoring device according to claim 1, wherein the circuitry is configured to extract, from the trunk acoustic pulse wave, the frequency component stemming from the apical beat based on comparison with a heart sound component.

6. The health monitoring device according to claim 5, wherein the circuitry is configured to extract the frequency component stemming from the apical beat, further taking a relation with a heart rate into consideration.

7. A non-transitory computer readable medium storing computer readable instructions thereon that when executed by a computer cause the computer to perform a method comprising:
processing a trunk acoustic pulse wave measured from the trunk of a person to estimate a health condition of the person, the computer program causing the computer to execute:
a procedure for matching a left ventricular pressure waveform resulting from filtering of the trunk acoustic pulse wave, with waveforms indicated according to a constant C, where a C value is a constant given by flow velocity and pressure, when x=0 and t=±0.35 seconds in a wave equation represented by the following equation:

$$u(t,x)=\phi(x-ct)+\phi(x-c(t+\alpha))=c/2\ \text{sech}^2(\sqrt{c}/2(x-ct)+c/2\ \text{sech}^2(\sqrt{c}/2(x-c(t+\alpha)))$$

and finding a C value of a corresponding one of the waveforms as an indicator relating to the left ventricular pressure waveform which indicates a behavior of the heart; and
a procedure for estimating the health condition of the person from a correlation between the indicator relating to the left ventricular pressure waveform and a vibration frequency of the frequency component stemming from the apical beat.

8. The non-transitory computer-readable medium according to claim 7, further comprising causing the computer to execute, in the procedure for estimating the health condition of the person, a procedure for estimating the health condition from a correlation between the indicator relating to the left ventricular pressure waveform and a diastolic time interval in a cardiac cycle, the diastolic time interval indicating a magnitude of the vibration frequency of the apical beat component.

9. The non-transitory computer-readable medium according to claim 7, further comprising causing the computer to execute, in the procedure for estimating the health condition of the person, a procedure for estimating blood pressure using the indicator relating to the left ventricular pressure waveform.

10. The non-transitory computer-readable medium according to claim 7, further comprising causing the computer to execute, in the procedure for extracting the frequency component stemming from the apical beat, a procedure for extracting, from the trunk acoustic pulse wave, the frequency component stemming from the apical beat based on comparison with a heart sound component.

11. The non-transitory computer-readable medium according to claim 10, wherein the procedure for extracting the frequency component stemming from the apical beat extracts the frequency component stemming from the apical beat, further taking a relation with a heart rate into consideration.

* * * * *